US010802864B2

(12) United States Patent
Nag et al.

(10) Patent No.: US 10,802,864 B2
(45) Date of Patent: Oct. 13, 2020

(54) MODULAR REINFORCEMENT-LEARNING-BASED APPLICATION MANAGER

(71) Applicant: VMware, Inc., Palo Alto, CA (US)

(72) Inventors: Dev Nag, Palo Alto, CA (US); Gregory T. Burk, Colorado Springs, CO (US); Janislav Jankov, Palo Alto, CA (US); Nick Stephen, Paris (FR); Dongni Wang, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 72 days.

(21) Appl. No.: 16/261,253

(22) Filed: Jan. 29, 2019

(65) Prior Publication Data

US 2020/0065128 A1 Feb. 27, 2020

Related U.S. Application Data

(60) Provisional application No. 62/723,388, filed on Aug. 27, 2018.

(51) Int. Cl.
| | |
|---|---|
| *G06F 9/455* | (2018.01) |
| *G06F 9/50* | (2006.01) |
| *G06N 20/00* | (2019.01) |
| *G06N 3/08* | (2006.01) |
| *G06F 9/48* | (2006.01) |

(52) U.S. Cl.
CPC ........ *G06F 9/45558* (2013.01); *G06F 9/4843* (2013.01); *G06F 9/5027* (2013.01); *G06F 9/5088* (2013.01); *G06N 3/08* (2013.01); *G06N 20/00* (2019.01); *G06F 2009/4557* (2013.01)

(58) Field of Classification Search
CPC .. G06F 9/45558; G06F 9/5027; G06F 9/5088; G06F 9/4843; G06N 20/00; G06N 3/08
USPC .......................................................... 718/1
See application file for complete search history.

(56) References Cited

U.S. PATENT DOCUMENTS

| | | | |
|---|---|---|---|
| 2009/0012922 A1* | 1/2009 | Tesauro | G06Q 10/06 706/12 |
| 2009/0098515 A1* | 4/2009 | Das | G09B 19/18 434/107 |

(Continued)

*Primary Examiner* — John Q Chavis

(57) ABSTRACT

The current document is directed to a modular reinforcement-learning-based application manager that can be deployed in various different computational environments without extensive modification and interface development. The currently disclosed modular reinforcement-learning-based application manager interfaces to observation and action adapters and metadata that provide a uniform and, in certain implementations, self-describing external interface to the various different computational environments which the modular reinforcement-learning-based application manager may be operated to control. In addition, certain implementations of the currently disclosed modular reinforcement-learning-based application manager interface to a user-specifiable reward-generation interface to allow the rewards that provide feedback from the computational environment to the modular reinforcement-learning-based application manager to be tailored to meet a variety of different user expectations and desired control policies.

21 Claims, 35 Drawing Sheets

(56) References Cited

U.S. PATENT DOCUMENTS

2009/0327172 A1* 12/2009 Liu .................. G06N 20/00
              706/12
2017/0366425 A1* 12/2017 Latapie ............... H04L 67/2804
2018/0082213 A1*  3/2018 McCord ................ G06N 20/00

* cited by examiner $R_4 = r_5 + \gamma r_6 + \gamma^2 r_7 + \gamma^3 r_8 \ldots \gamma^{T-5} r_T$ where $0 \leq \gamma \leq 1$ $R_t = \sum_{k=0}^{T} \gamma^k r_{t+k+1}$ $V^\pi(s) = E\{R_t \mid s_t = s, \pi\}$ $Q^\pi(s,a) = E\{R_t \mid s_t = s, a_t = a, \pi\}$ $\pi^*$ is optimal $\Rightarrow \forall s \in S$ and $\pi \in \Pi$, $V^{\pi^*}(s) \geq V^\pi(s)$

FIG. 17

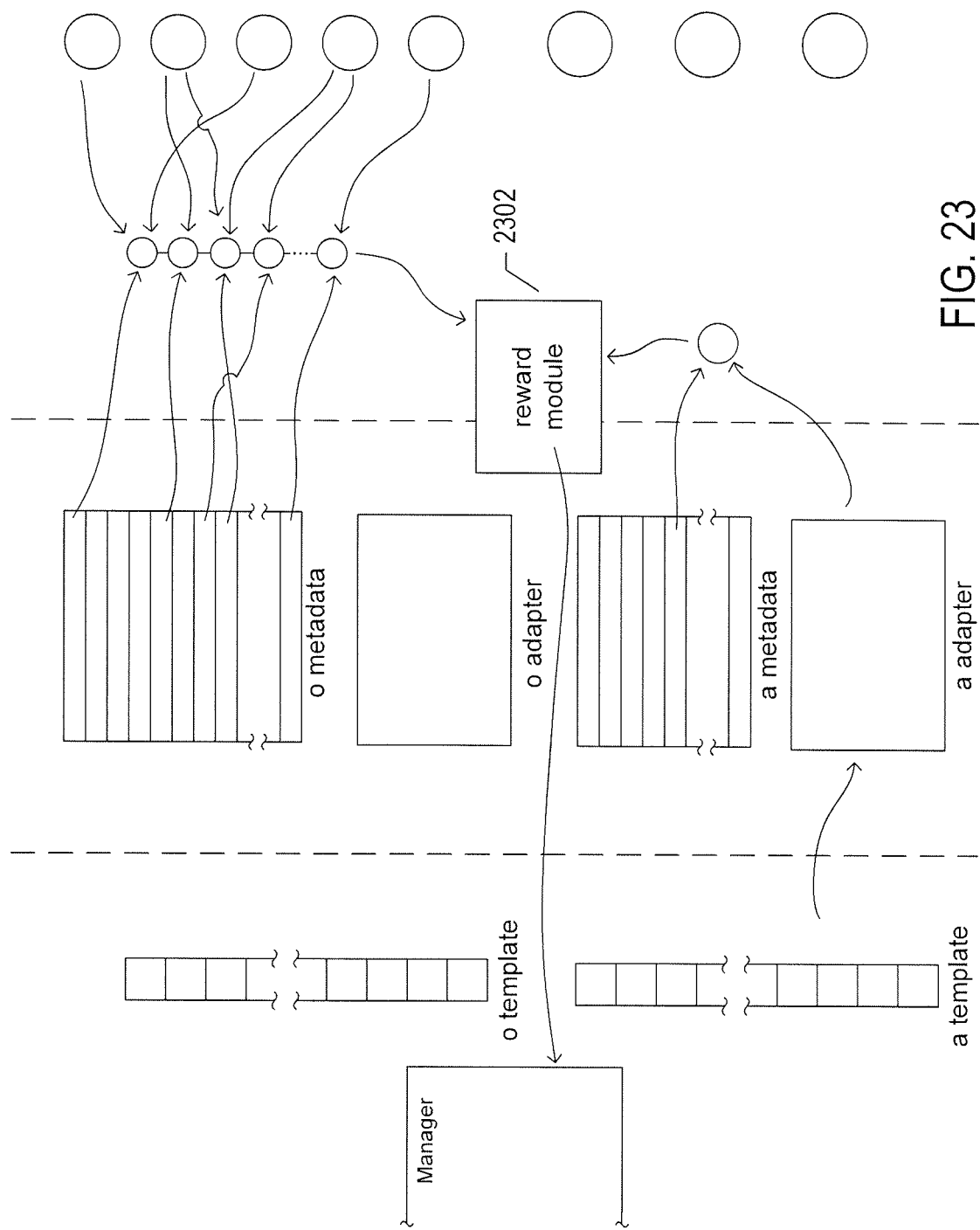

```
{
  "actions_A"
  {
    "version" : "3.1",                          ─ 2602
    "number_of_actions" : "1000"                ─ 2604
  },
  {
    "actions" :
    {                                           ─ 2606
      "ID": "integer",
      "descriptions" : [
        {
2608 ─    "name" : "allocate_max_memory",
          "description" : "allocate the maximum amount of memory for virtual
                            machine in which application is running from virtualization
                            layer"
        },
        {                               ─ 2612                              ─ 2614
          "name" : "add_memory",
          "description" : "allocate additional memory for a virtual machine in which
                            application is running from virtualization layer",
          "arguments" : [
2610        {
              "name" : "memory-size",           ─ 2616
              "data_type" : "integer",
              "units" : "Mbytes"
            }
          ]
        }
        ...
      ]
    }
  }
}
```

FIG. 26A

MODULAR REINFORCEMENT-LEARNING-BASED APPLICATION MANAGER

CROSS-REFERENCE TO RELATED APPLICATION

This application claims the benefit of Provisional Application No. 62/723,388, filed Aug. 27, 2018.

TECHNICAL FIELD

The current document is directed to standalone, networked, and distributed computer systems and, in particular, to a modular reinforcement-learning-based application manager that may run within a variety of different environments.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems has, in turn, become increasingly complex, involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Therefore, designers and developers of various types of automated management and control systems related to distributed computing systems are seeking alternative design-and-implementation methodologies, including machine-learning-based approaches. The application of machine-learning technologies to the management of complex computational environments is still in early stages, but promises to expand the practically achievable feature sets of automated administration-and-management systems, decrease development costs, and provide a basis for more effective optimization Of course, administration-and-management control systems developed for distributed computer systems can often be applied to administer and manage standalone computer systems and individual, networked computer systems.

SUMMARY

The current document is directed to a modular reinforcement-learning-based application manager that can be deployed in various different computational environments without extensive modification and interface development. The currently disclosed modular reinforcement-learning-based application manager interfaces to observation and action adapters and metadata that provide a uniform and, in certain implementations, self-describing external interface to the various different computational environments which the modular reinforcement-learning-based application manager may be operated to control. In addition, certain implementations of the currently disclosed modular reinforcement-learning-based application manager interface to a user-specifiable reward-generation interface to allow the rewards that provide feedback from the computational environment to the modular reinforcement-learning-based application manager to be tailored to meet a variety of different user expectations and desired control policies.

BRIEF DESCRIPTION OF THE DRAWINGS

In FIG. 9, three different physical data centers 902-904 are shown below planes representing the cloud-director layer of abstraction 906-908.

FIG. 17 provides additional details about the operation of the manager, environment, and universe.

FIG. 23 illustrates an additional feature of the currently disclosed modular reinforcement-learning-based application manager.

FIGS. 26A-B illustrate an example of one implementation of action metadata and how a generic action is output by the action adapter.

DETAILED DESCRIPTION

Figure 1:
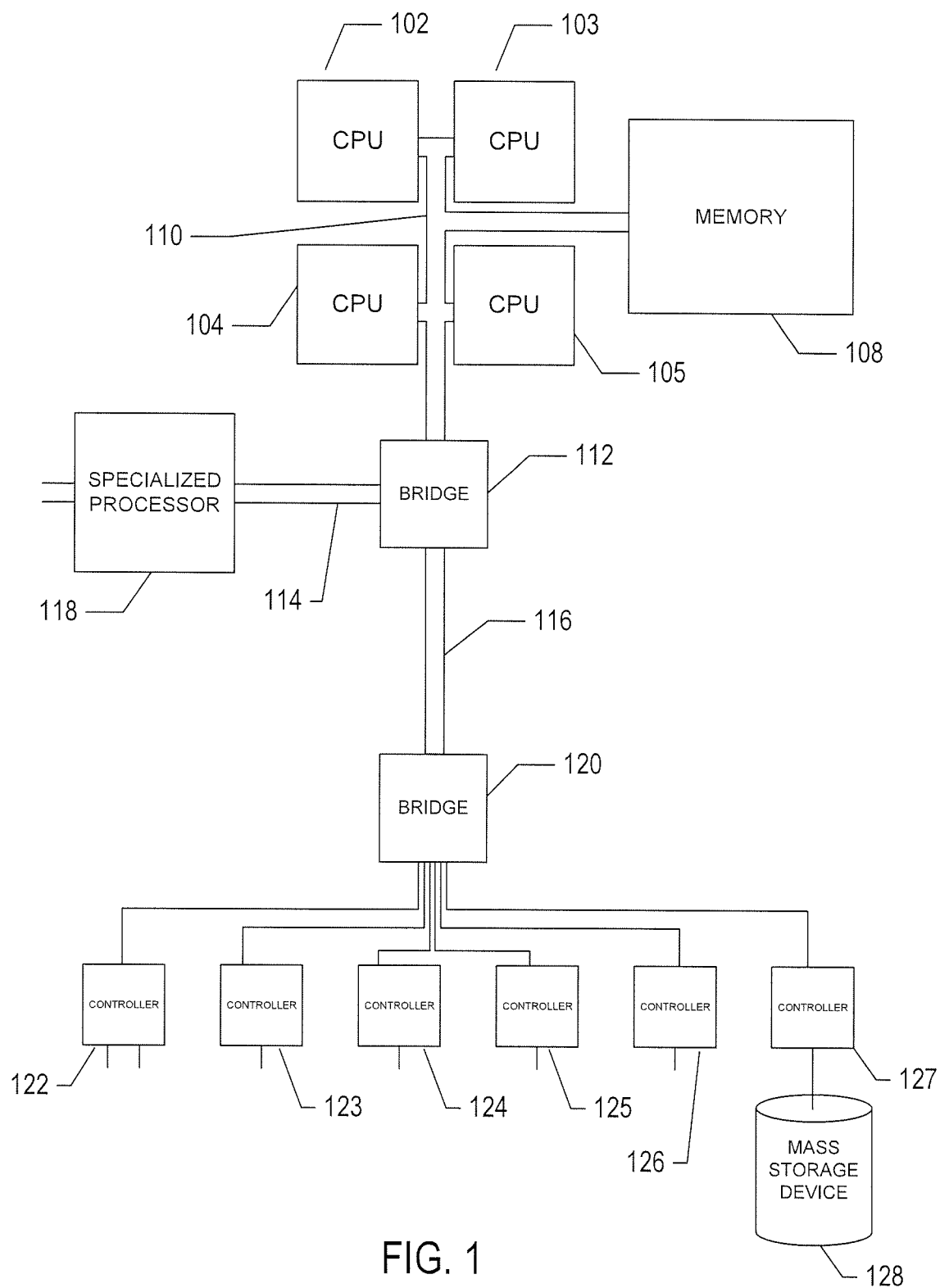
FIG. 1 provides a general architectural diagram for various types of computers.

The current document is directed to a modular reinforcement-learning-based application manager that can be deployed in various different computational environments without extensive modification and interface development. In a first subsection, below, a detailed description of computer hardware, complex computational systems, and virtualization is provided with reference to FIGS. 1-11. In a second subsection, application management and reinforcement learning are discussed with refence to FIGS. 11-20. In a third subsection, implementations of the currently disclosed modular reinforcement-learning application manager are introduced and described with reference to FIGS. 21A-26B.

Computer Hardware, Complex Computational Systems, Virtualization, and Generation of Status, Informational, and Error Data The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
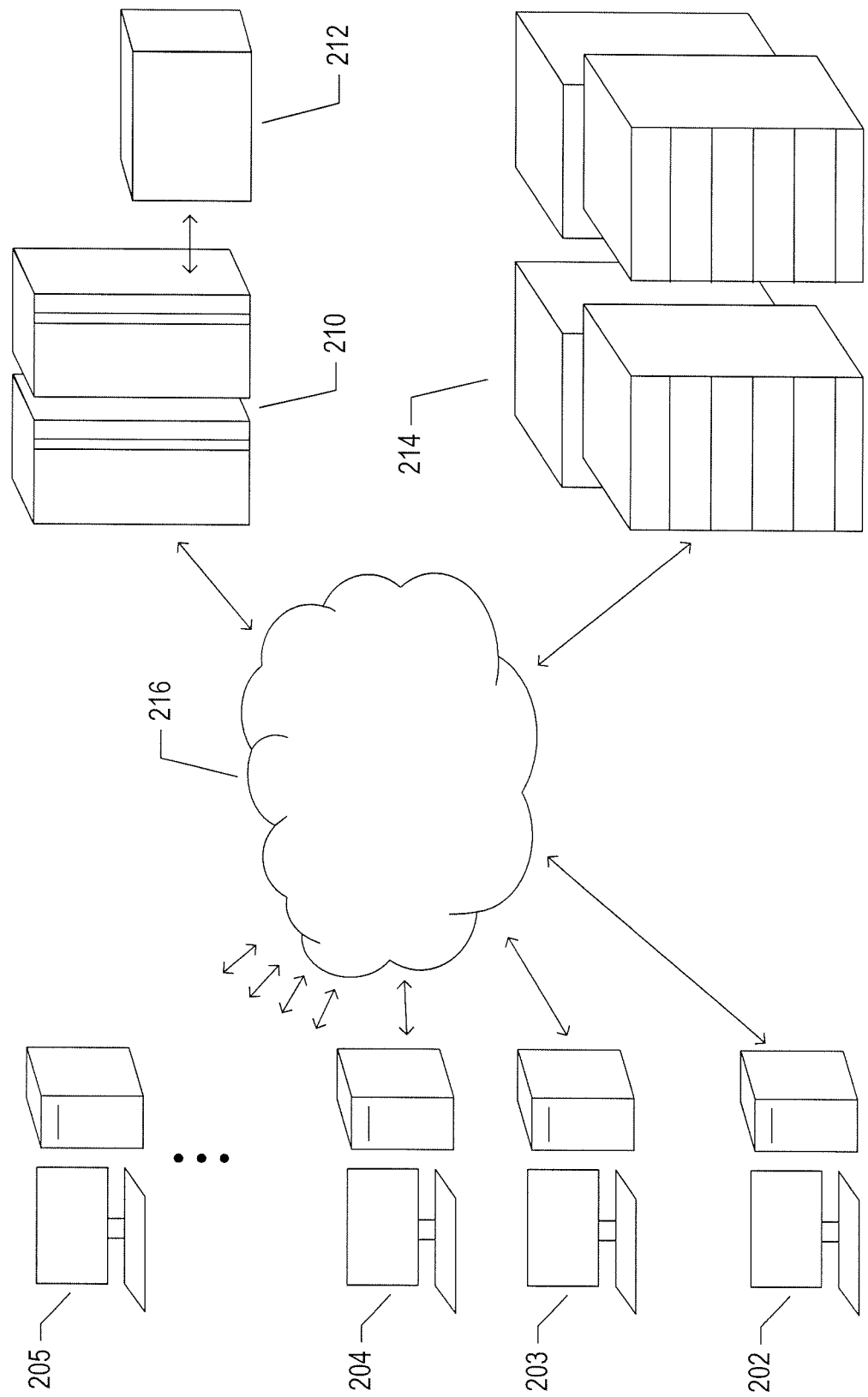
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
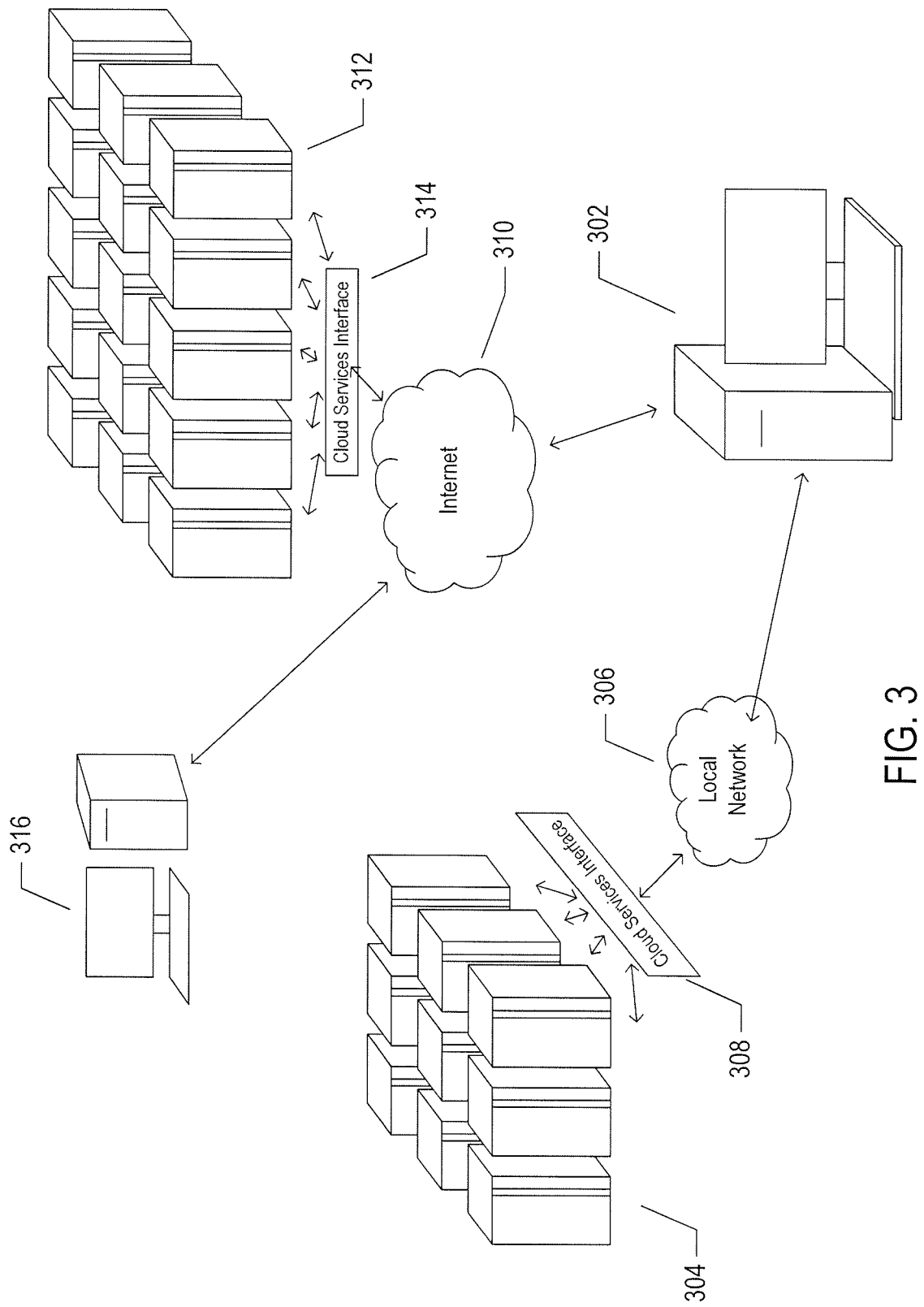
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
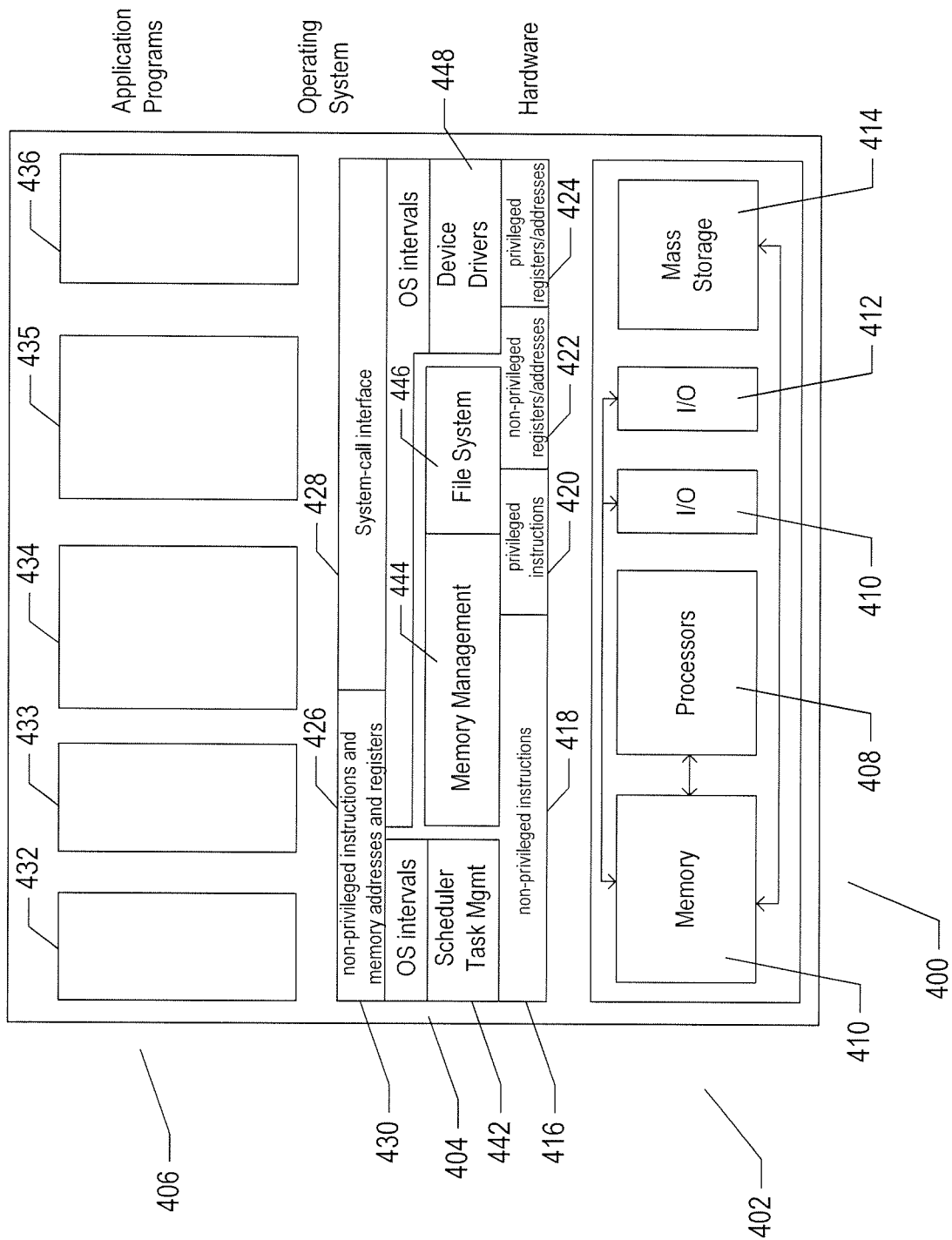
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
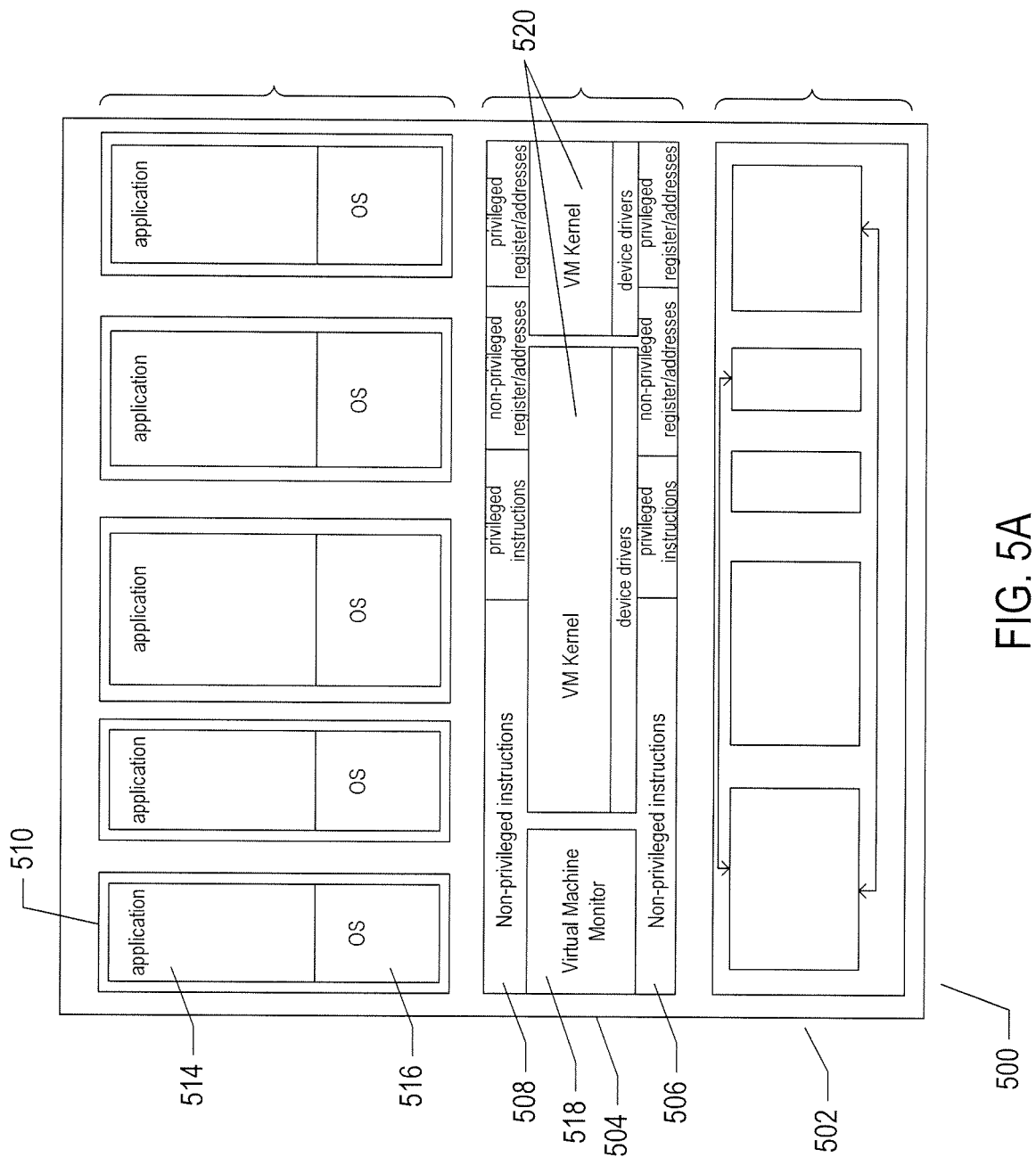
FIGS. 5A-B illustrate two types of virtual machine and virtual-machine execution environments.
Figure 5B:
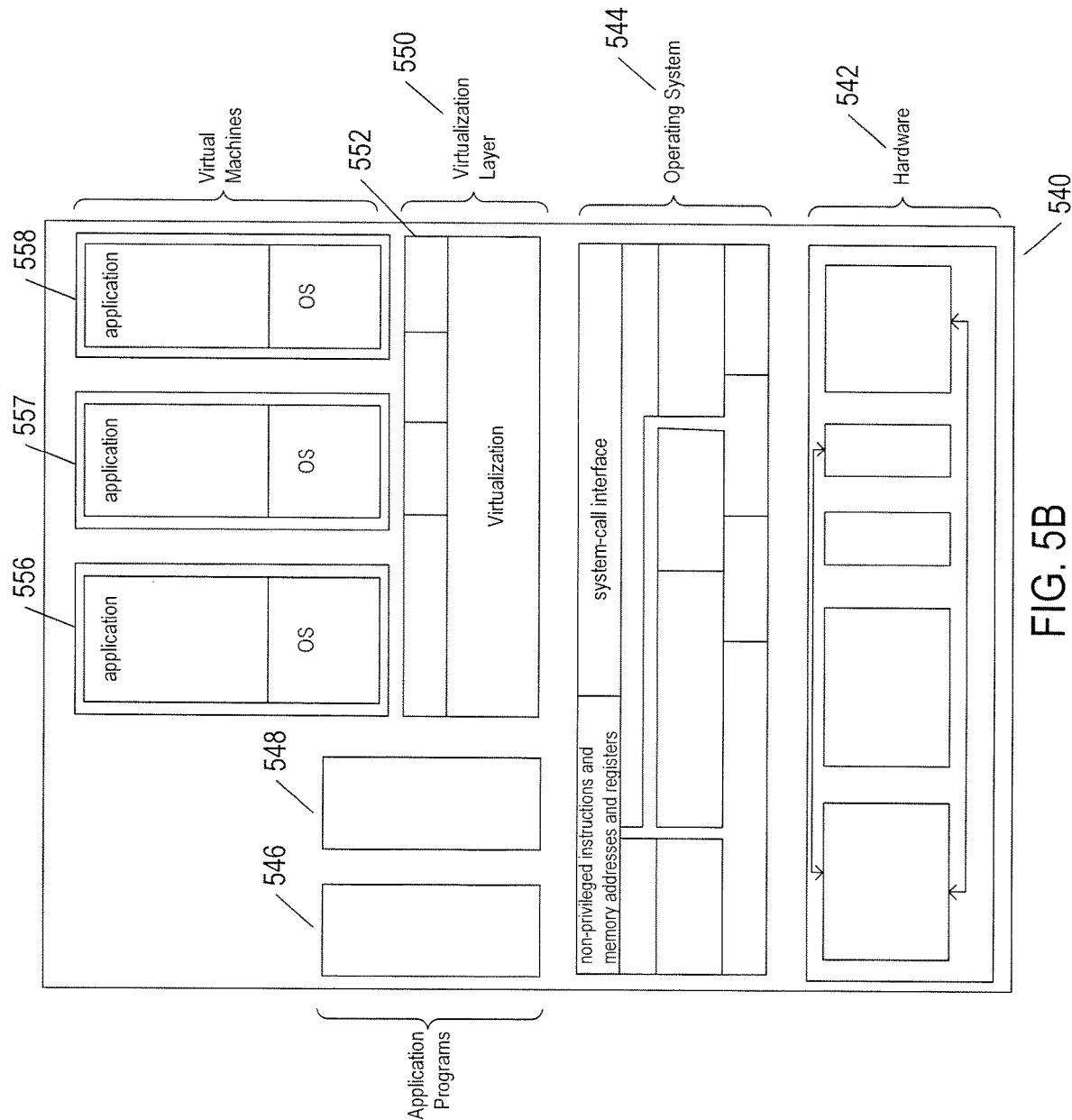

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
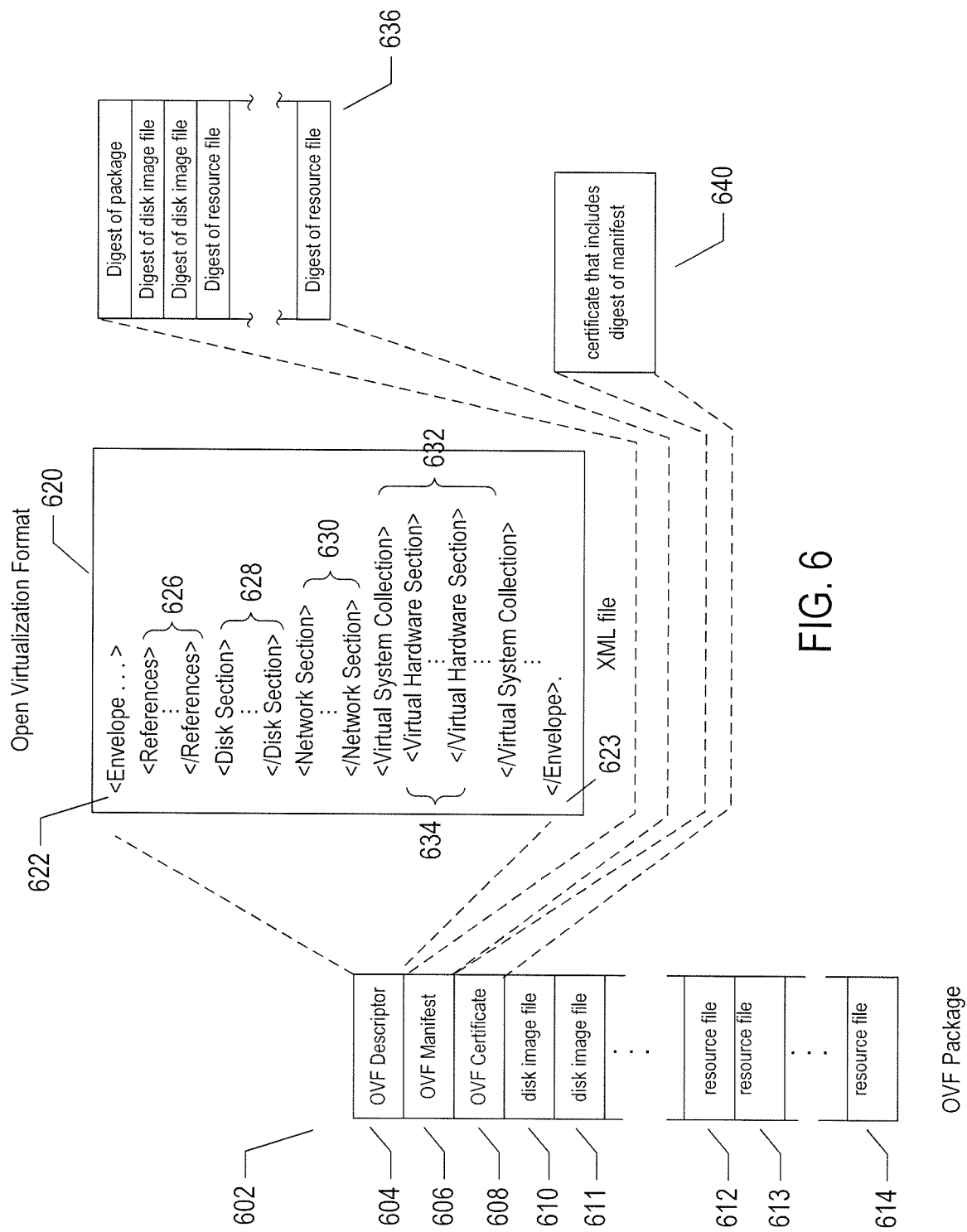
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
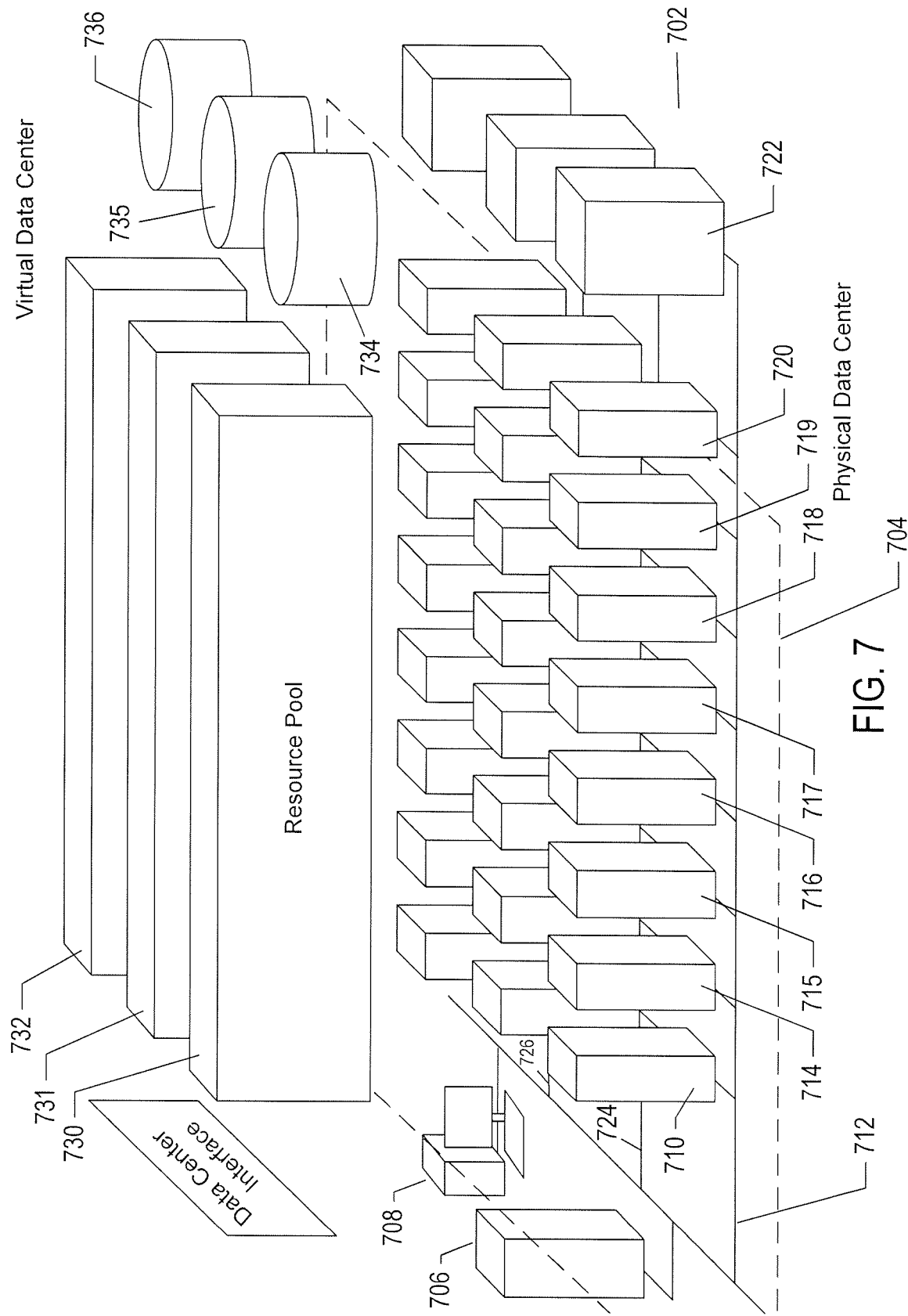
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
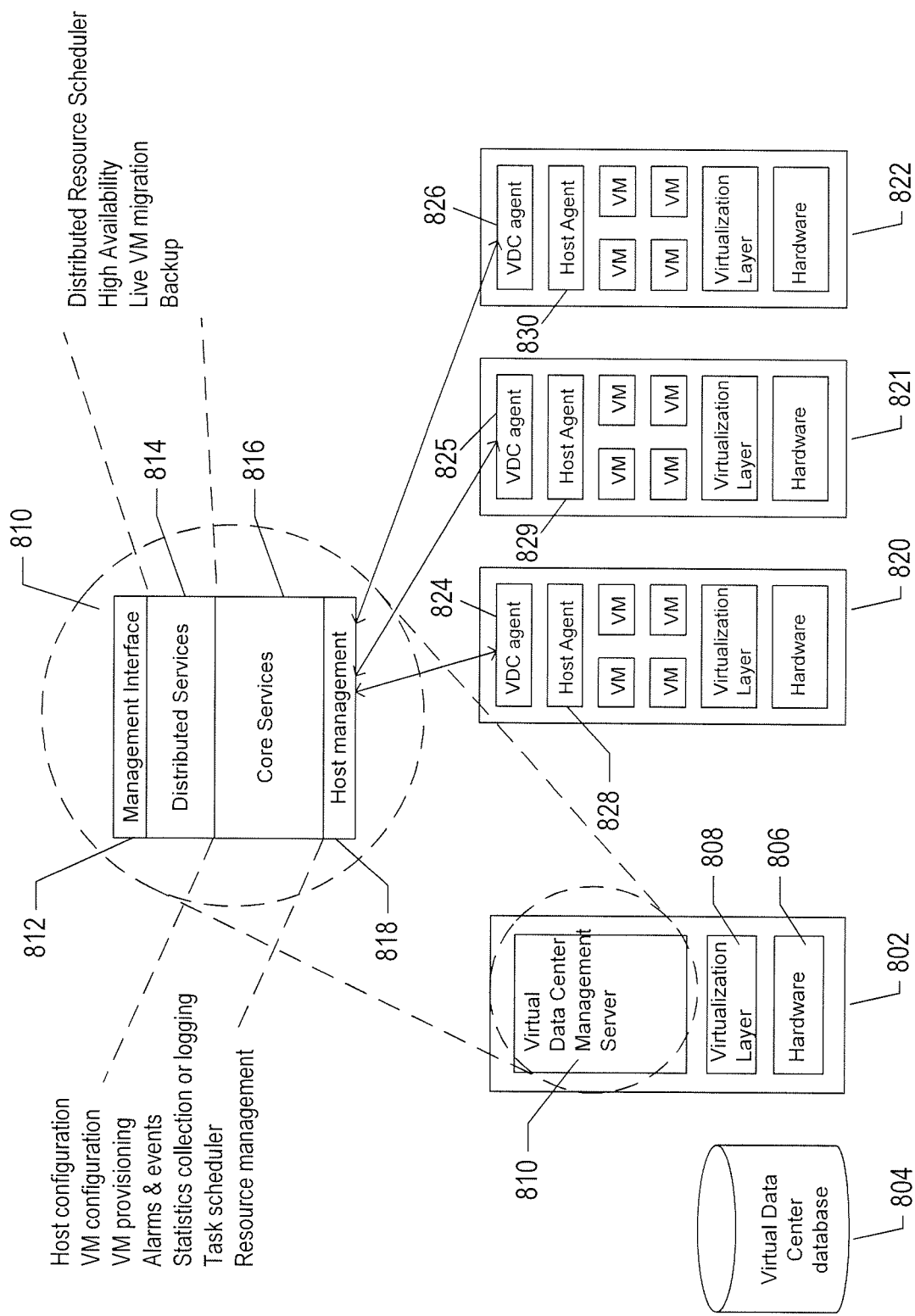
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
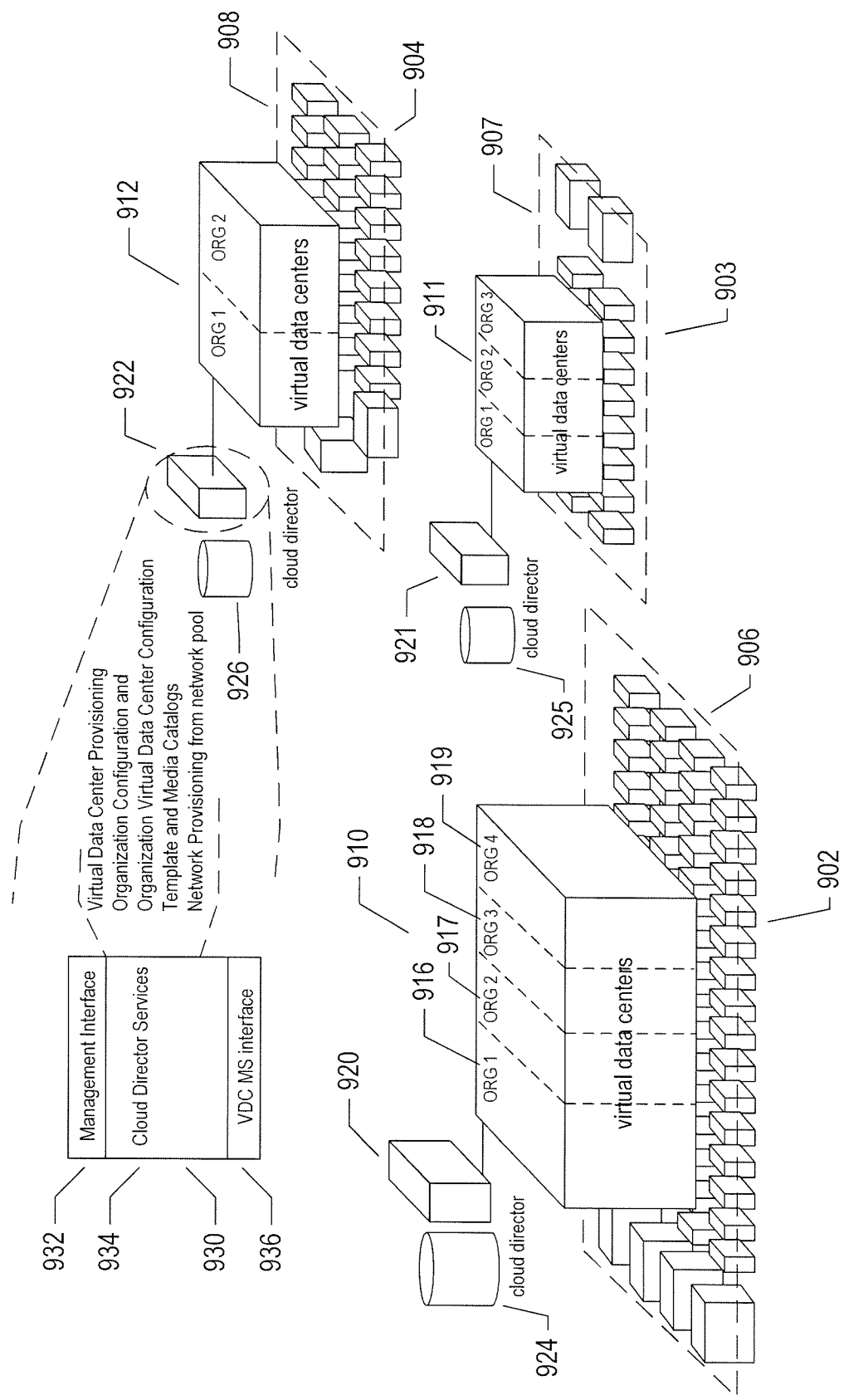
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
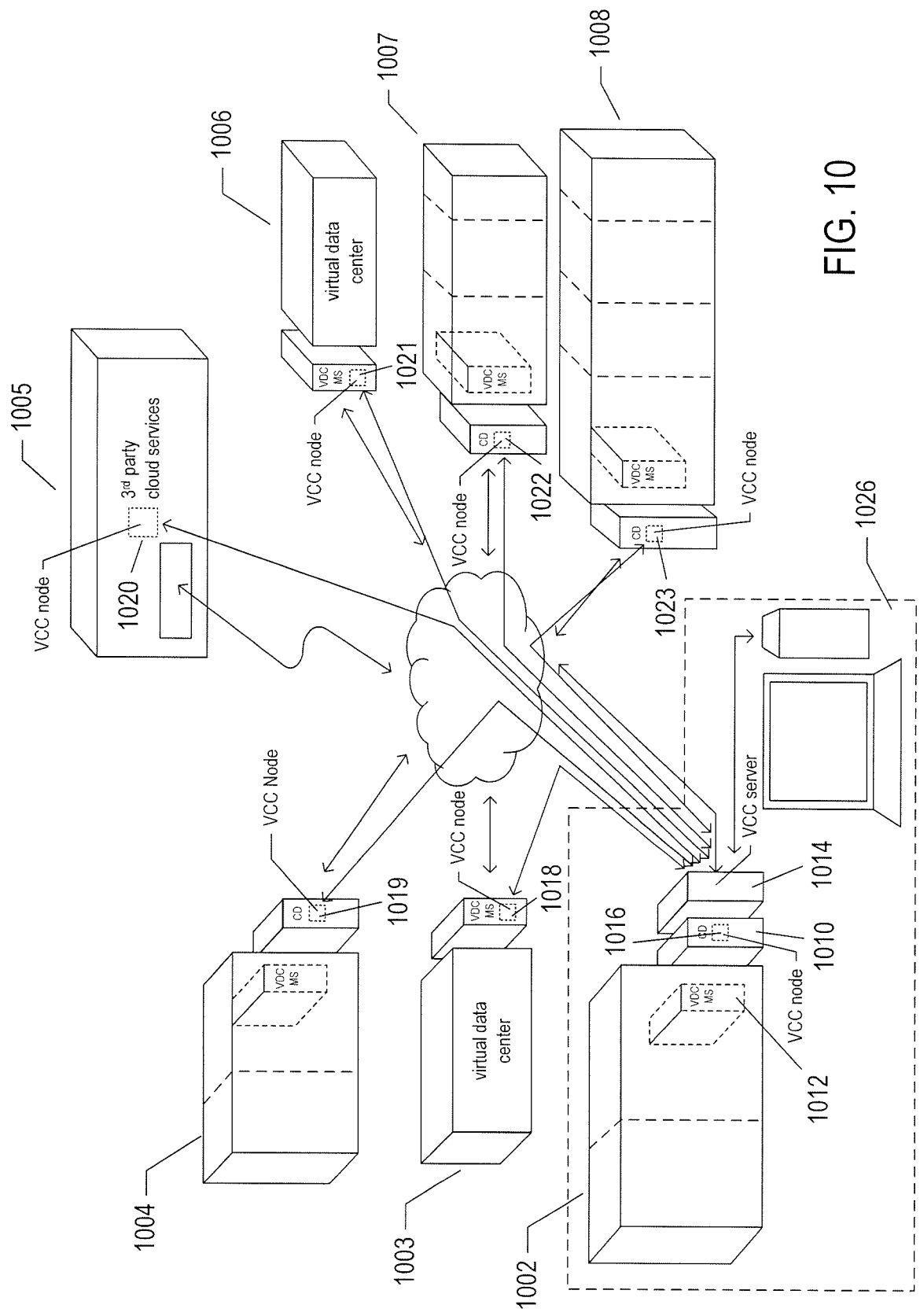
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Application Management and Reinforcement Learning

Figure 11A:
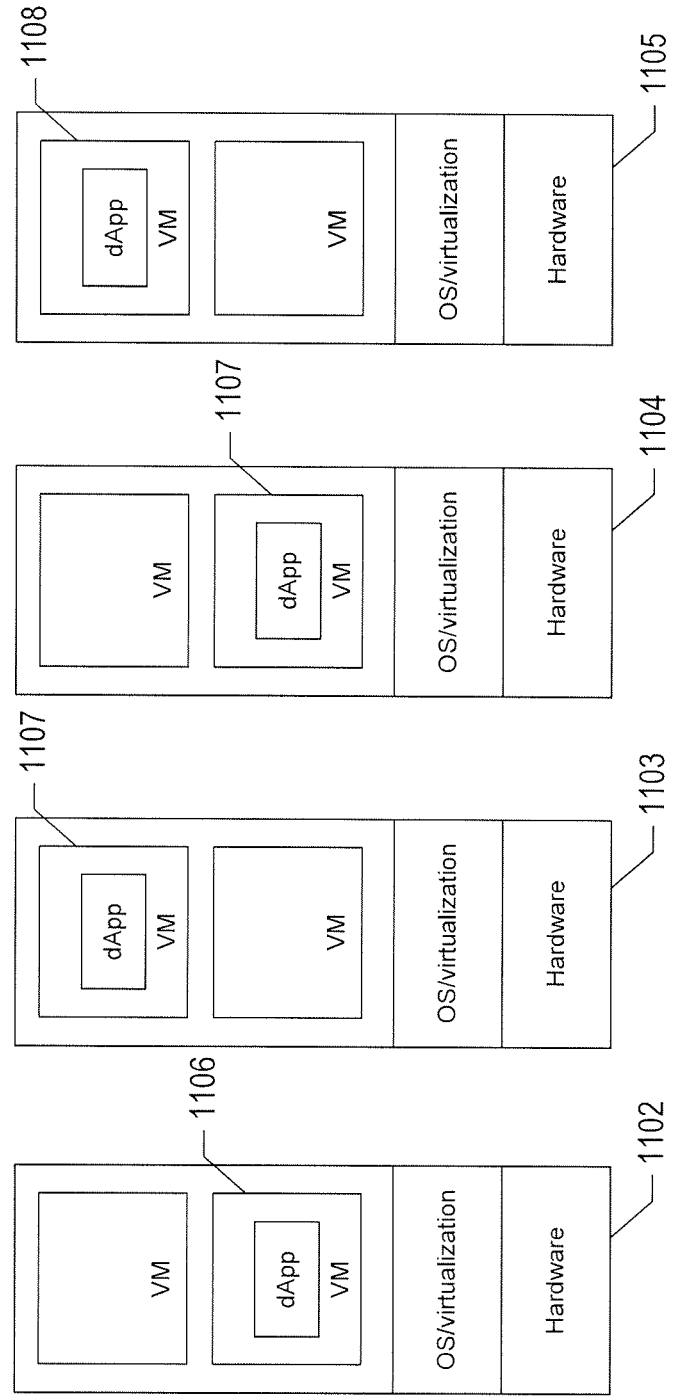
FIGS. 11A-C illustrate an application manager.
Figure 11B:
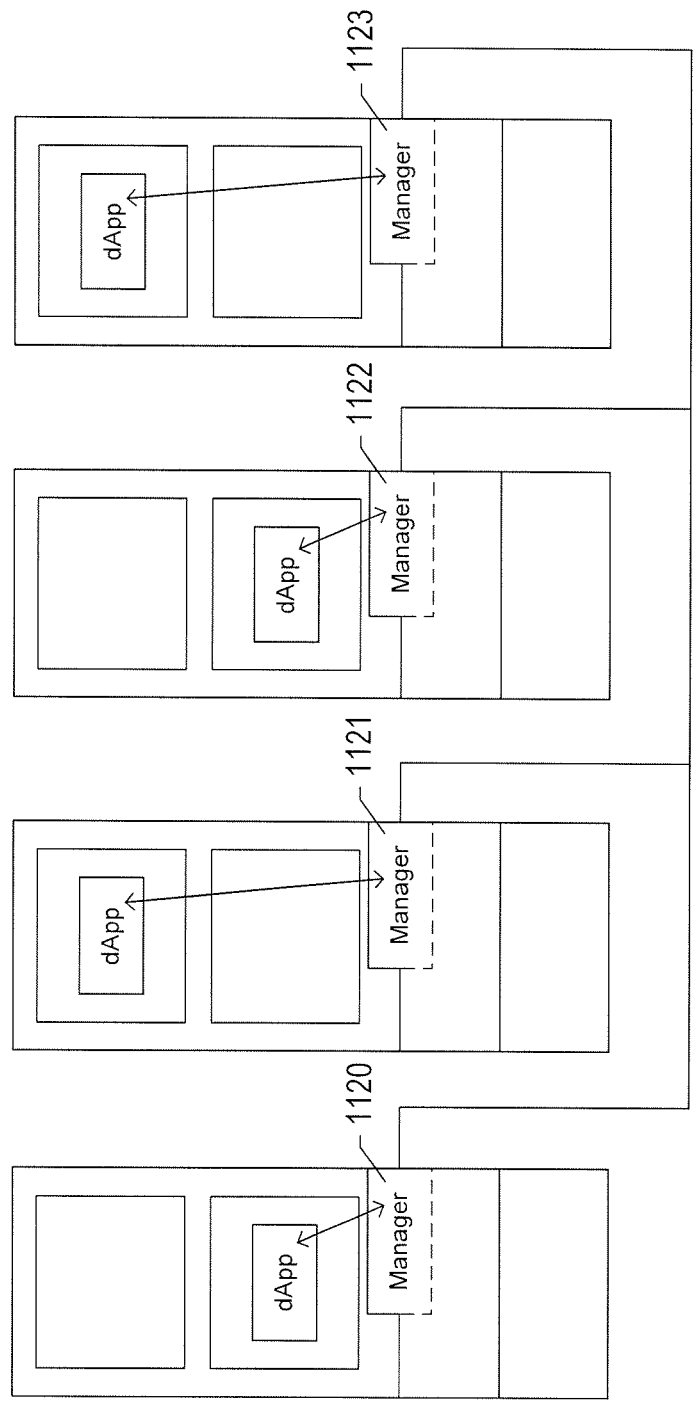
Figure 11C:
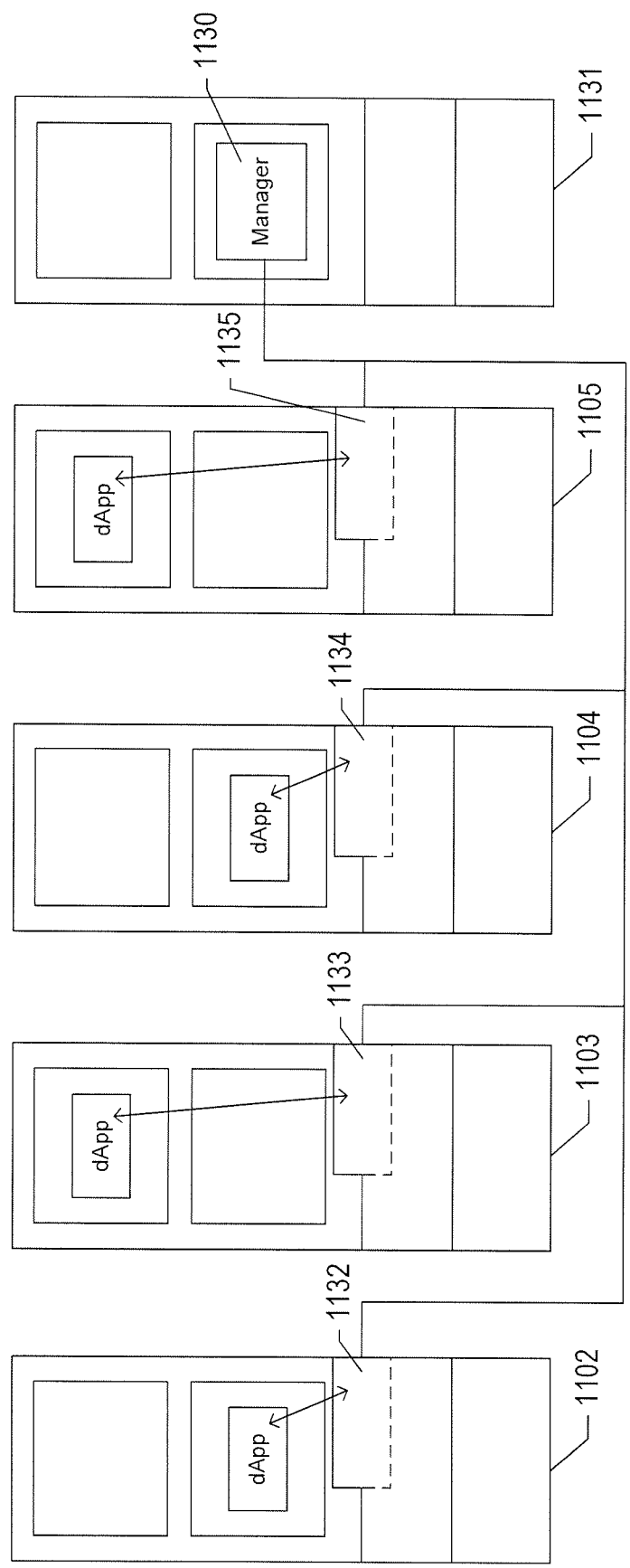

FIGS. 11A-C illustrate an application manager. All three figures use the same illustration conventions, next described with reference to FIG. 11A. The distributed computing system is represented, in FIG. 11A, by four servers 1102-1105 that each support execution of a virtual machine, 1106-1108 respectively, that provides an execution environment for a local instance of the distributed application. Of course, in real-life cloud-computing environments, a particular distributed application may run on many tens to hundreds of individual physical servers. Such distributed applications often require fairly continuous administration and management. For example, instances of the distributed application may need to be launched or terminated, depending on current computational loads, and may be frequently relocated to different physical servers and even to different cloud-computing facilities in order to take advantage of favorable pricing for virtual-machine execution, to obtain necessary computational throughput, and to minimize networking latencies. Initially, management of distributed applications as well as the management of multiple, different applications executing on behalf of a client or client organization of one or more cloud-computing facilities was carried out manually through various management interfaces provided by cloud-computing facilities and distributed-computer data centers. However, as the complexity of distributed-computing environments has increased and as the numbers and complexities of applications concurrently executed by clients and client organizations have increased, efforts have been undertaken to develop automated application managers for automatically monitoring and managing applications on behalf of clients and client organizations of cloud-computing facilities and distributed-computer-system-based data centers.

As shown in FIG. 11B, one approach to automated management of applications within distributed computer systems is to include, in each physical server on which one or more of the managed applications executes, a local instance of the distributed application manager 1120-1123. The local instances of the distributed application manager cooperate, in peer-to-peer fashion, to manage a set of one or more applications, including distributed applications, on behalf of a client or client organization of the data center or cloud-computing facility. Another approach, as shown in FIG. 11C, is to run a centralized or centralized-distributed application manager 1130 on one or more physical servers 1131 that communicates with application-manager agents 1132-1135 on the servers 1102-1105 to support control and management of the managed applications. In certain cases, application-management facilities may be incorporated within the various types of management servers that manage virtual data centers and aggregations of virtual data centers discussed in the previous subsection of the current document. The phrase "application manager" means, in this document, an automated controller than controls and manages applications programs and the computational environment in which they execute. Thus, an application manager may interface to one or more operating systems and virtualization layers, in addition to applications, in various implementations, to control and manage the applications and their computational environments. In certain implementations, an application manager may even control and manage virtual and/or physical components that support the computational environments in which applications execute.

In certain implementations, an application manager is configured to manage applications and their computational environments within one or more distributed computing systems based on a set of one or more policies, each of which may include various rules, parameter values, and other types of specifications of the desired operational characteristics of the applications. As one example, the one or more policies may specify maximum average latencies for responding to user requests, maximum costs for executing virtual machines per hour or per day, and policy-driven approaches to optimizing the cost per transaction and the number of transactions carried out per unit of time. Such overall policies may be implemented by a combination of finer-grain policies, parameterized control programs, and other types of controllers that interface to operating-system and virtualization-layer-management subsystems. However, as the numbers and complexities of applications desired to be managed on behalf of clients and client organizations of data centers and cloud-computing facilities continues to increase, it is becoming increasingly difficult, if not practically impossible, to implement deterministic-policy-driven application management. As a result, a new approach to application management based on the machine-learning technique referred to as "reinforcement learning" has been undertaken.

Figure 12:
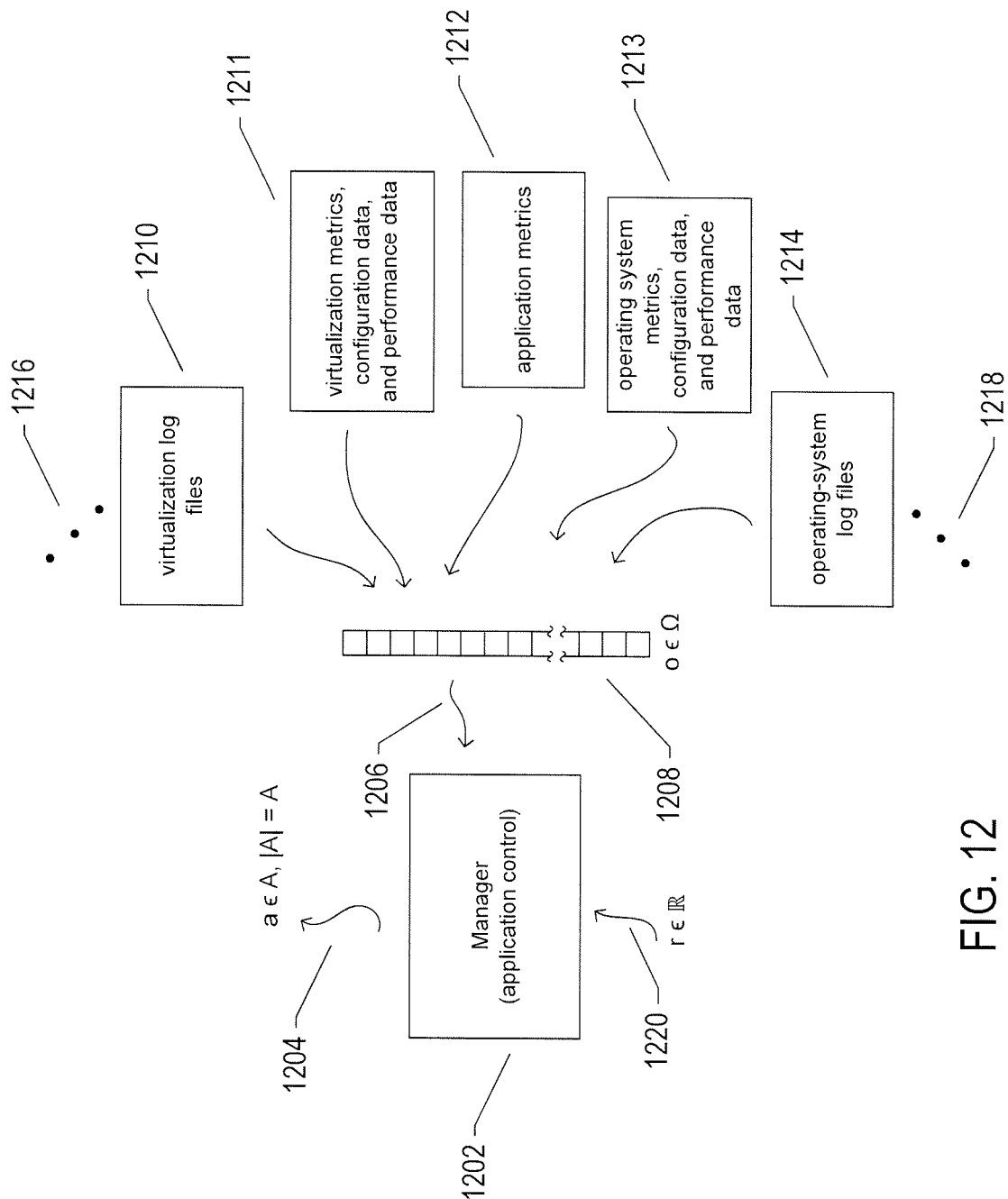
FIG. 12 illustrates, at a high level of abstraction, a reinforcement-learning-based application manager controlling a computational environment, such as a cloud-computing facility.

FIG. 12 illustrates, at a high level of abstraction, a reinforcement-learning-based application manager controlling a computational environment, such as a cloud-computing facility. The reinforcement-learning-based application manager 1202 manages one or more applications by emitting or issuing actions, as indicated by arrow 1204. These actions are selected from a set of actions A of cardinality |A|. Each action a in the set of actions A can be generally thought of as a vector of numeric values that specifies an operation that the manager is directing the environment to carry out. The environment may, in many cases, translate the action into one or more environment-specific operations that can be carried out by the computational environment controlled by the reinforcement-learning-based application manager. It should be noted that the cardinality |A| may be indeterminable, since the numeric values may include real values, and the action space may be therefore effectively continuous or effectively continuous in certain dimensions. The operations represented by actions may be, for example, commands, including command arguments, executed by operating systems, distributed operating systems, virtualization layers, management servers, and other types of control components and subsystems within one or more distributed computing systems or cloud-computing facilities. The reinforcement-learning-based application manager receives observations from the computational environment, as indicated by arrow 1206. Each observation o can be thought of as a vector of numeric values 1208 selected from a set of possible observation vectors $\Omega$. The set $\Omega$ may, of course, be quite large and even practically innumerable. Each element of the observation o represents, in certain implementations, a particular type of metric or observed operational characteristic, numerically encoded, that is related to the computational environment. The metrics may have discrete values or real values, in various implementations. For example, the metrics or observed operational characteristics may indicate the amount of memory allocated for applications and/or application instances, networking latencies experienced by one or more applications, an indication of the number of instruction-execution cycles carried out on behalf of applications or local-application instances, and many other types of metrics and operational characteristics of the managed applications and the computational environment in which the managed applications run. As shown in FIG. 12, there are many different sources 1210-1214 for the values included in an observation o, including virtualization-layer and operating-system log files 1210 and 1214, virtualization-layer metrics, configuration data, and performance data provided through a virtualization-layer management interface 1211, various types of metrics generated by the managed applications 1212, and operating-system metrics, configuration data, and performance data 1213. Ellipses 1216 and 1218 indicate that there may be many additional sources for observation values. In addition to receiving observation vectors o, the reinforcement-learning-based application manager receives rewards, as indicated by arrow 1220. Each reward is a numeric value that represents the feedback provided by the computational environment to the reinforcement-learning-based application manager after carrying out the most recent action issued by the manager and transitioning to a resultant state, as further discussed below. The reinforcement-learning-based application manager is generally initialized with an initial policy that specifies the actions to be issued in response to received observations and over time, as the application manager interacts with the environment, the application manager adjusts the internally maintained policy according to the rewards received following issuance of each action. In many cases, after a reasonable period of time, a reinforcement-learning-based application manager is able to learn a near-optimal or optimal policy for the environment, such as a set of distributed applications, that it manages. In addition, in the case that the managed environment evolves over time, a reinforcement-learning-based application manager is able to continue to adjust the internally maintained policy in order to track evolution of the managed environment so that, at any given point in time, the internally maintained policy is near-optimal or optimal. In the case of an application manager, the computational environment in which the applications run may evolve through changes to the configuration and components, changes in the computational load experienced by the applications and computational environment, and as a result of many additional changes and forces. The received observations provide the information regarding the managed environment that allows the reinforcement-learning-based application manager to infer the current state of the environment which, in turn, allows the reinforcement-learning-based application manager to issue actions that push the managed environment towards states that, over time, produce the greatest reward feedbacks. Of course, similar reinforcement-learning-based application managers may be employed within standalone computer systems, individual, networked computer systems, various processor-controlled devices, including smart phones, and other devices and systems that run applications.

Figure 13:
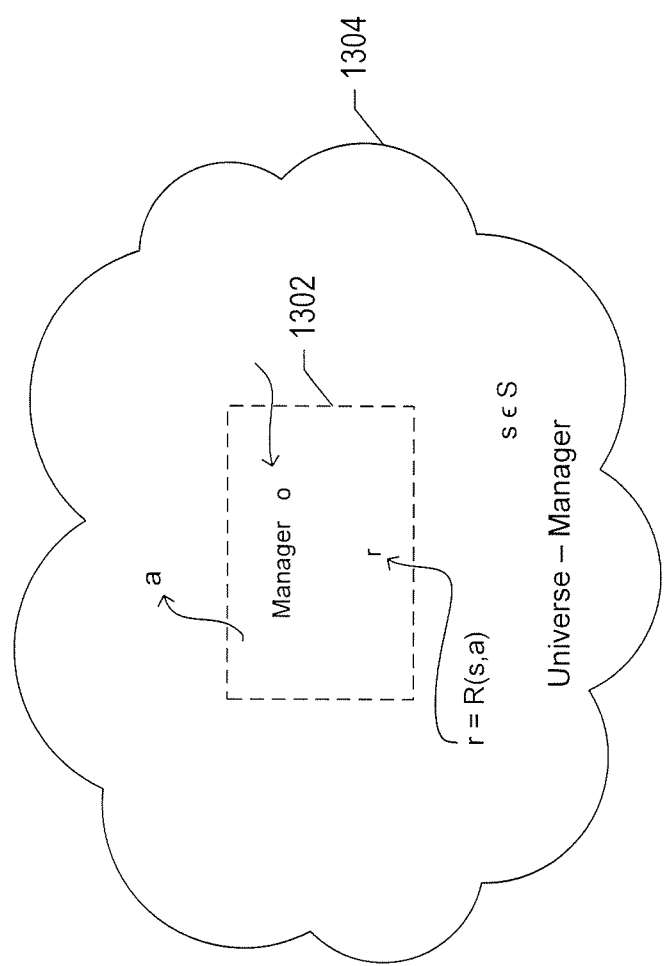
FIG. 13 summarizes the reinforcement-learning-based approach to control.

FIG. 13 summarizes the reinforcement-learning-based approach to control. The manager or controller 1302, referred to as a "reinforcement-learning agent," is contained within, but is distinct and separate from, the universe 1304. Thus, the universe comprises the manager or controller 1302 and the portion of the universe not included in the manager, in set notation referred to as "universe—manager." In the current document, the portion of the universe not included in the manager is referred to as the "environment." In the case of an application manager, the environment includes the managed applications, the physical computational facilities in which they execute, and even generally includes the physical computational facilities in which the manager executes. The rewards are generated by the environment and the reward-generation mechanism cannot be controlled or modified by the manager.

Figure 14A:
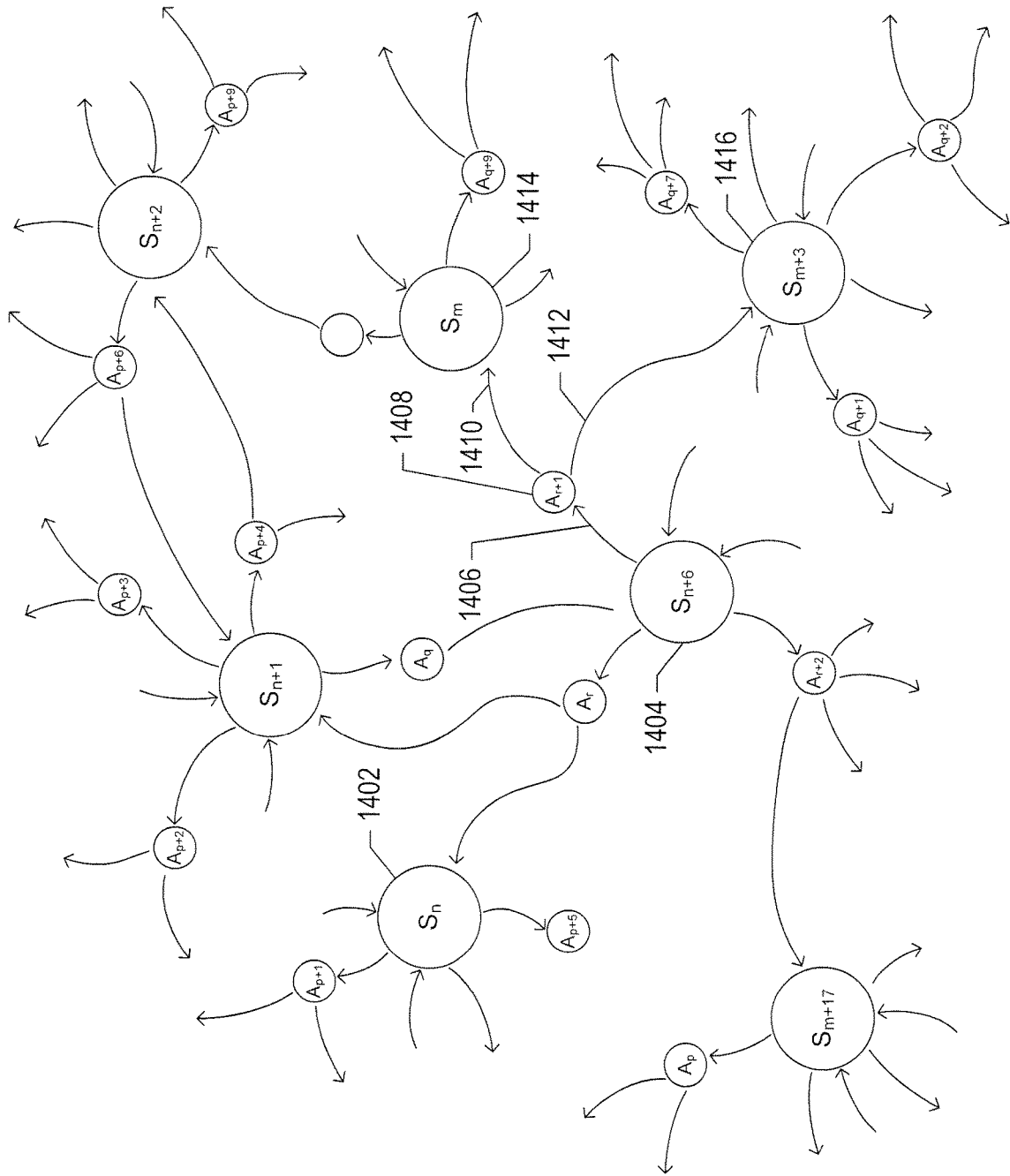
FIGS. 14A-B illustrate states of the environment.
Figure 14B:
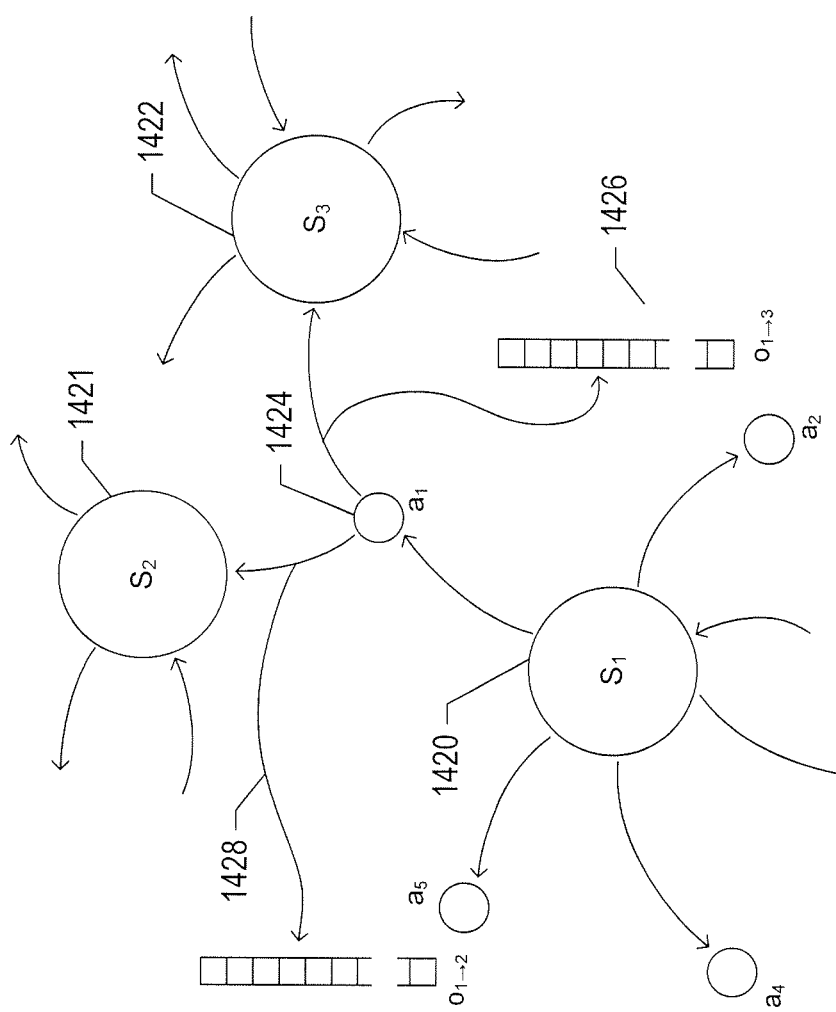

FIGS. 14A-B illustrate states of the environment. In the reinforcement-learning approach, the environment is considered to inhabit a particular state at each point in time. The state may be represented by one or more numeric values or character-string values, but generally is a function of hundreds, thousands, millions, or more different variables. The observations generated by the environment and transmitted to the manager reflect the state of the environment at the time that the observations are made. The possible state transitions can be described by a state-transition diagram for the environment. FIG. 14A illustrates a portion of a state-transition diagram. Each of the states in the portion of the state-transition diagram shown in FIG. 14A are represented by large, labeled disks, such as disc 1402 representing a particular state $S_n$. The transition between one state to another state occurs as a result of an action, emitted by the manager, that is carried out within the environment. Thus, arrows incoming to a given state represent transitions from other states to the given state and arrows outgoing from the given state represent transitions from the given state to other states. For example, one transition from state 1404, labeled $S_{n+6}$, is represented by outgoing arrow 1406. The head of this arrow points to a smaller disc that represents a particular action 1408. This action node is labeled $A_{r+1}$. The labels for the states and actions may have many different forms, in different types of illustrations, but are essentially unique identifiers for the corresponding states and actions. The fact that outgoing arrow 1406 terminates in action 1408 indicates that transition 1406 occurs upon carrying out of action 1408 within the environment when the environment is in state 1404. Outgoing arrows 1410 and 1412 emitted by action node 1408 terminate at states 1414 and 1416, respectively. These arrows indicate that carrying out of action 1408 by the environment when the environment is in state 1404 results in a transition either to state 1414 or to state 1416. It should also be noted that an arrow emitted from an action node may return to the state from which the outgoing arrow to the action node was emitted. In other words, carrying out of certain actions by the environment when the environment is in a particular state may result in the environment maintaining that state. Starting at an initial state, the state-transition diagram indicates all possible sequences of state transactions that may occur within the environment. Each possible sequence of state transitions is referred to as a "trajectory."

FIG. 14B illustrates additional details about state-transition diagrams and environmental states and behaviors. FIG. 14B shows a small portion of a state-transition diagram that includes three state nodes 1420-1422. A first additional detail is the fact that, once an action is carried out, the transition from the action node to a resultant state is accompanied by the emission of an observation, by the environment, to the manager. For example, a transition from state 1420 to state 1422 as a result of action 1424 produces observation 1426, while transition from state 1420 to state 1421 via action 1424 produces observation 1428. A second additional detail is that each state transition is associated with a probability. Expression 1430 indicates that the probability of transitioning from state $s_1$ to state $s_2$ as a result of the environment carrying out action $a_1$, where s indicates the current state of the environment and s' indicates the next state of the environment following s, is output by the state-transition function T, which takes, as arguments, indications of the initial state, the final state, and the action. Thus, each transition from a first state through a particular action node to a second state is associated with a probability. The second expression 1432 indicates that probabilities are additive, so that the probability of a transition from state $s_1$ to either state $s_2$ or state $s_3$ as a result of the environment carrying out action $a_1$ is equal to the sum of the probability of a transition from state $s_1$ to state $s_2$ via action $a_1$ and the probability of a transition from state $s_1$ to state $s_3$ via action $a_1$. Of course, the sum of the probabilities associated with all of the outgoing arrows emanating from a particular state is equal to 1.0, for all non-terminal states, since, upon receiving an observation/reward pair following emission of a first action, the manager emits a next action unless the manager terminates. As indicated by expressions 1434, the function O returns the probability that a particular observation o is returned by the environment given a particular action and the state to which the environment transitions following execution of the action. In other words, in general, there are many possible observations o that might be generated by the environment following transition to a particular state through a particular action, and each possible observation is associated with a probability of occurrence of the observation given a particular state transition through a particular action.

Figure 15:
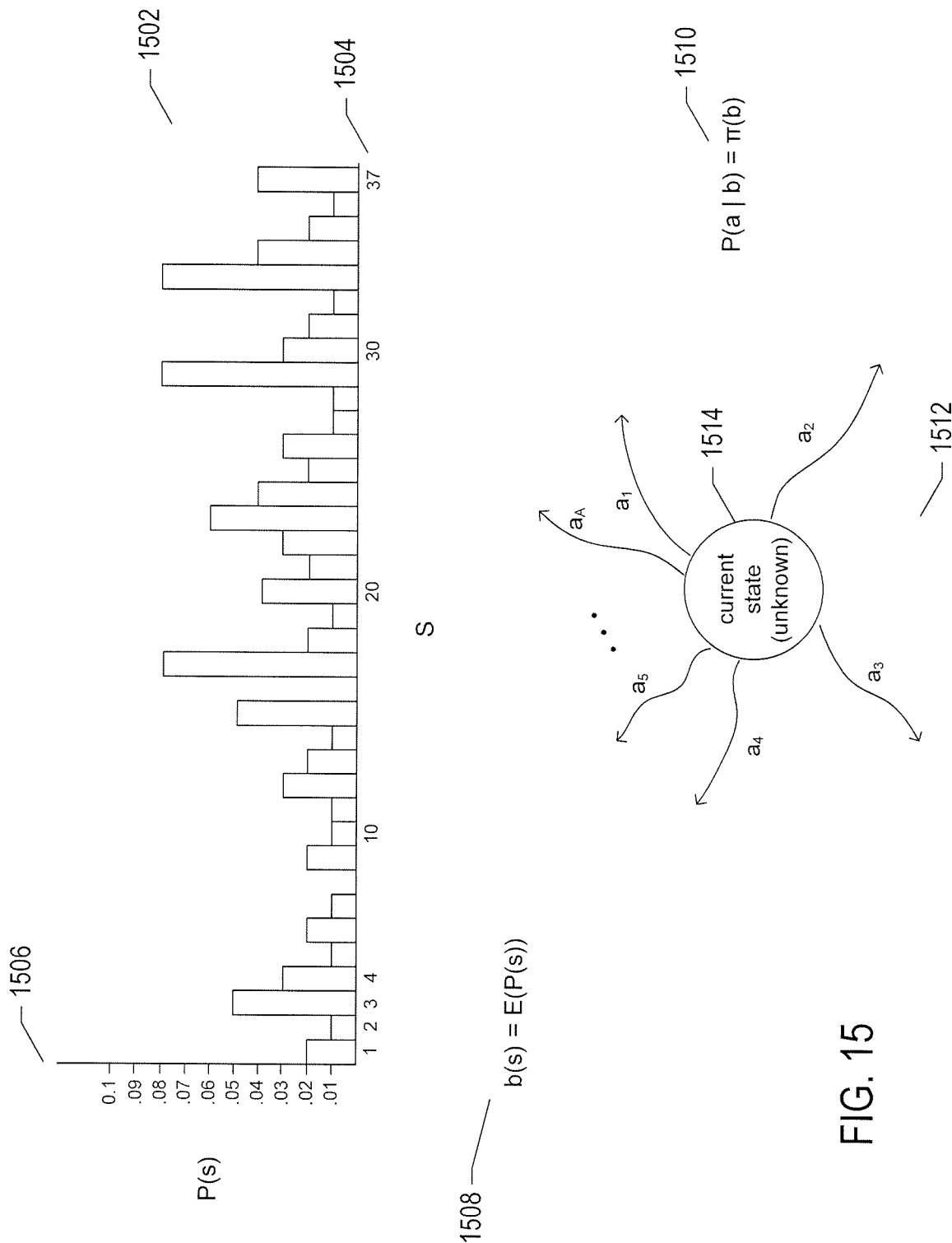
FIG. 15 illustrates the concept of belief.

FIG. 15 illustrates the concept of belief. At the top of FIG. 15, a histogram 1502 is shown. The horizontal axis 1502 represents 37 different possible states for a particular environment and the vertical axis 1506 represents the probability of the environment being in the corresponding state at some point in time. Because the environment must be in one state at any given point in time, the sum of the probabilities for all the states is equal to 1.0. Because the manager does not know the state of the environment, but instead only knows the values of the elements of the observation following the last executed action, the manager infers the probabilities of the environment being in each of the different possible states. The manager's belief that the current state of the environment is s, b(s), is the expectation of the probability that the environment is in state s, as expressed by equation 1508. Thus, the belief b is a probability distribution which could be represented in a histogram similar to histogram 1502. Over time, the manager accumulates information regarding the current state of the environment and the probabilities of state transitions as a function of the belief distribution and most recent actions, as a result of which the belief probability distribution b shifts towards an increasingly non-uniform distribution with greater probabilities for the actual state of the environment. In a deterministic and transparent environment, in which the manager knows the current state of the environment, the policy π maintained by the manager can be thought of as a function that returns the next action a to be emitted by the manager to the environment based on the current state of the environment, or, in mathematical notation, a=π(s). However, in the non-deterministic and non-transparent environment in which application managers operate, the policy π maintained by the manager determines a probability for each action based on the current belief distribution b, as indicated by expression 1510 in FIG. 15. Thus, as indicated by the diagram of a state 1512, at any point in time, the manager does not generally certainly know the current state of the environment, as indicated by the label 1514 within the node representation of the current date 1512, as a result of which there is some probability, for each possible state, that the environment is currently in that state. This, in turn, implies that there is some non-zero probability that each of the possible actions that the manager can issue should be the next issued action.

Figure 16A:
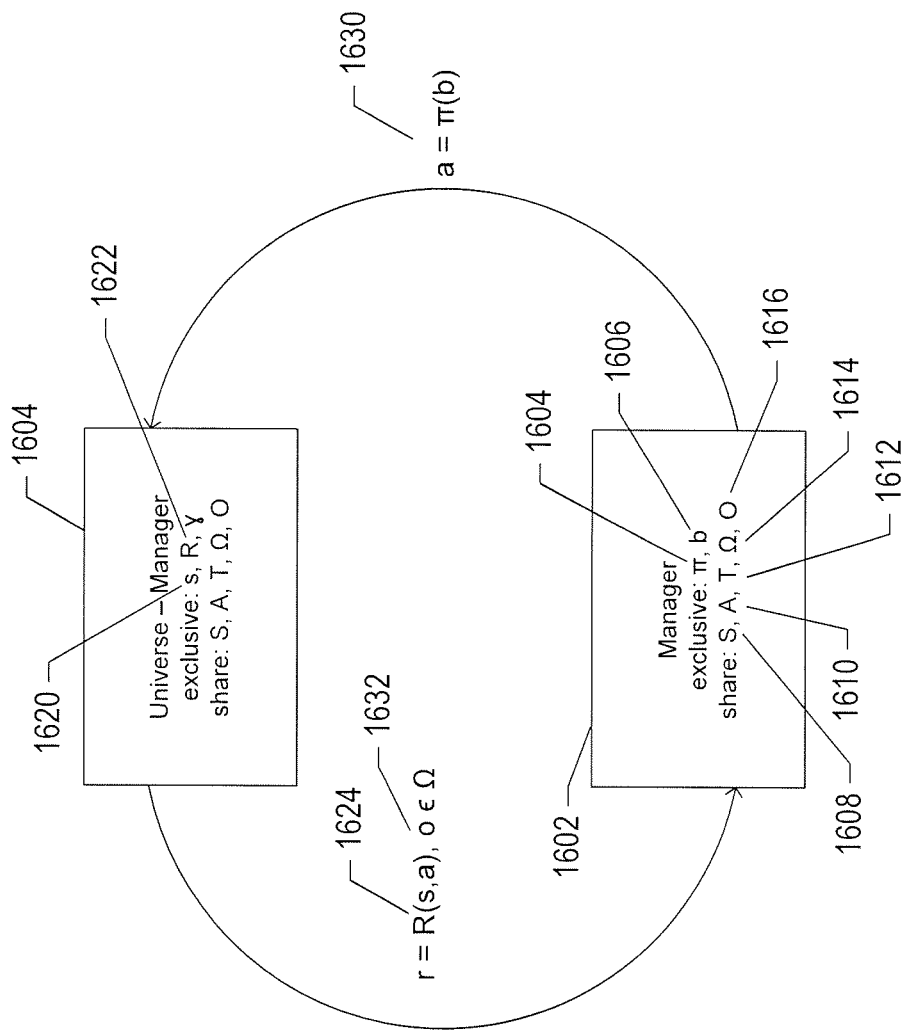
FIGS. 16A-B illustrate a simple flow diagram for the universe comprising the manager and the environment in one approach to reinforcement learning.
Figure 16B:
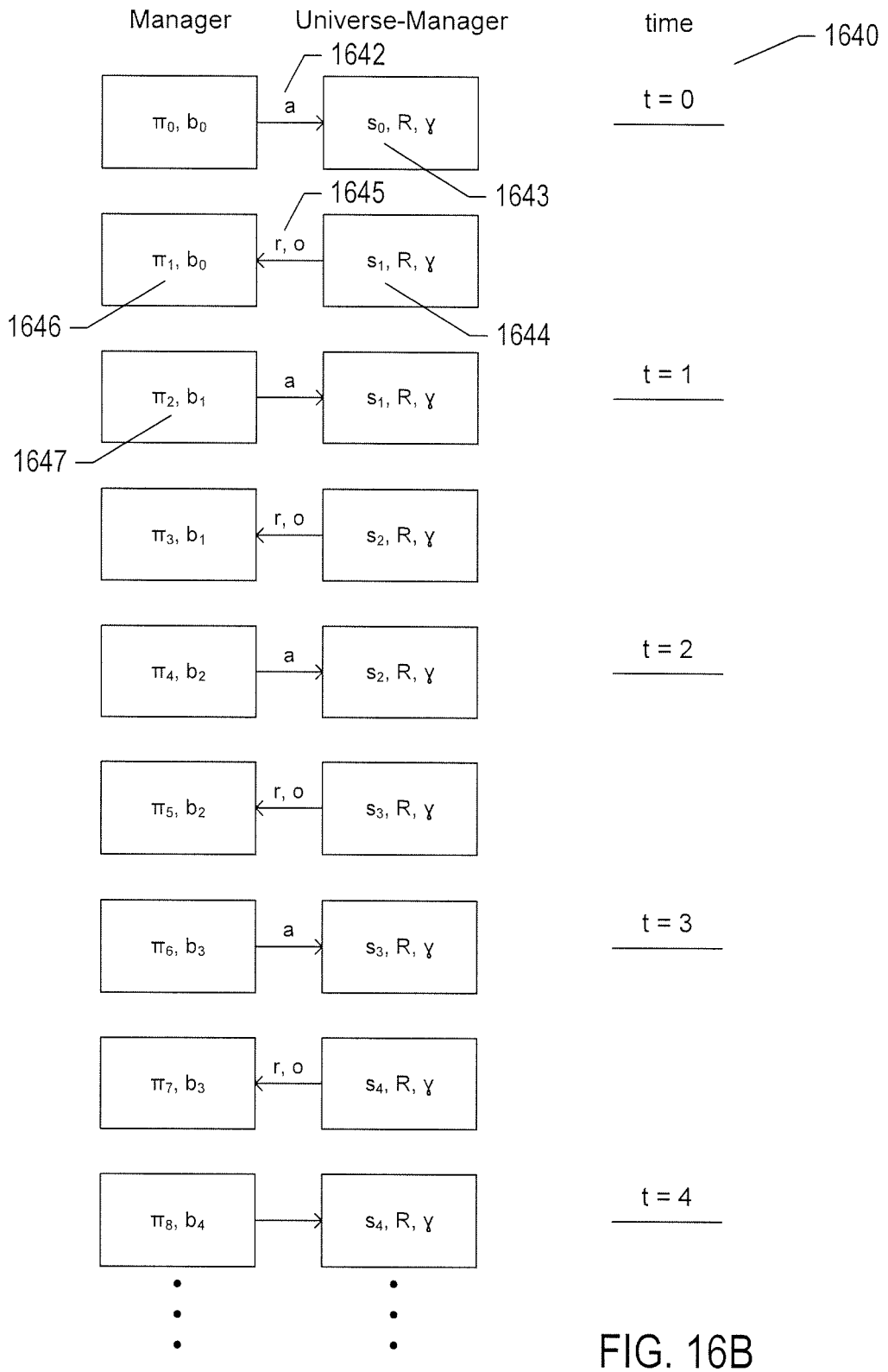

FIGS. 16A-B illustrate a simple flow diagram for the universe comprising the manager and the environment in one approach to reinforcement learning. The manager 1602 internally maintains a policy $\pi$ 1604 and a belief distribution b 1606 and is aware of the set of environment states S 1608, the set of possible actions A 1610, the state-transition function T 1612, the set of possible observations $\Omega$ 1614 and, and the observation-probability function O 1616, all discussed above. The environment 1604 shares knowledge of the sets S, A, and $\Omega$ and the functions T and O with the manager, but maintains the current state of the environment s 1620, a reward function R 1622 that returns a reward r in response to an input current state s and an input action a received while in the current state 1624, and a discount parameter $\gamma$ 1626, discussed below. The manager is initialized with an initial policy and belief distribution. The manager emits a next action 1630 based on the current belief distribution which the environment then carries out, resulting in the environment occupying a resultant state and then issues a reward 1624 and an observation o 1632 based on the resultant state and the received action. The manager receives the reward and observation, generally updates the internally stored policy and belief distribution, and then issues a next action, in response to which the environment transitions to a resultant state and emits a next reward and observation. This cycle continues indefinitely or until a termination condition arises.

It should be noted that this is just one model of a variety of different specific models that may be used for a reinforcement-learning agent and environment. There are many different models depending on various assumptions and desired control characteristics.

FIG. 16B shows an alternative way to illustrate operation of the universe. In this alternative illustration method, a sequence of time steps is shown, with the times indicated in a right-hand column 1640. Each time step consists of issuing, by the manager, an action to the environment and issuing, by the environment, a reward and observation to the manager. For example, in the first time step t=0, the manager issues an action a 1642, the environment transitions from state $s_0$ 1643 to $s_1$ 1644, and the environment issues a reward r and observation o 1645 to the manager. As a result, the manager updates the policy and belief distribution in preparation for the next time step. For example, the initial policy and belief distribution $\pi_0$ and $b_0$ 1646 are updated to the policy and belief distribution $\pi_1$ and $b_1$ 1647 at the beginning of the next time step t=1. The sequence of states $\{s_0, s_1, \ldots\}$ represents the trajectory of the environment as controlled by the manager. Each time step is thus equivalent to one full cycle of the control-flow-diagram-like representation discussed above with reference to FIG. 16A.

FIG. 17 provides additional details about the operation of the manager, environment, and universe. At the bottom of FIG. 17, a trajectory for the manager and environment is laid out horizontally with respect to the horizontal axis 1702 representing the time steps discussed above with reference to FIG. 16B. A first horizontal row 1704 includes the environment states, a second horizontal row 1706 includes the belief distributions, and a third horizontal row 1708 includes the issued rewards. At any particular state, such as circled state $s_4$ 1710, one can consider all of the subsequent rewards, shown for state $s_4$ within box 1712 in FIG. 17. The discounted return for state $s_4$, $R_4$, is the sum of a series of discounted rewards 1714. The first term in the series 1716 is the reward $r_5$ returned when the environment transitions from state $s_4$ to state $s_5$. Each subsequent term in the series includes the next reward multiplied by the discount rate $\gamma$ raised to a power. The discounted reward can be alternatively expressed using a summation, as indicated in expression 1718. The value of a given state s, assuming a current policy $\pi$, is the expected discounted return for the state, and is returned by a value function $V^\pi(\ )$, as indicated by expression 1720. Alternatively, an action-value function returns a discounted return for a particular state and action, assuming a current policy, as indicated by expression 1722. An optimal policy $\pi^*$ provides a value for each state that is greater than or equal to the value provided by any possible policy $\pi$ in the set of possible policies $\Pi$. There are many different ways for achieving an optimal policy. In general, these involve running a manager to control an environment while updating the value function $V^\pi(\ )$ and policy $\pi$, either in alternating sessions or concurrently. In some approaches to reinforcement learning, when the environment is more or less static, once an optimal policy is obtained during one or more training runs, the manager subsequently controls the environment according to the optimal policy. In other approaches, initial training generates an initial policy that is then continuously updated, along with the value function, in order to track changes in the environment so that a near-optimal policy is maintained by the manager.

Figure 18:
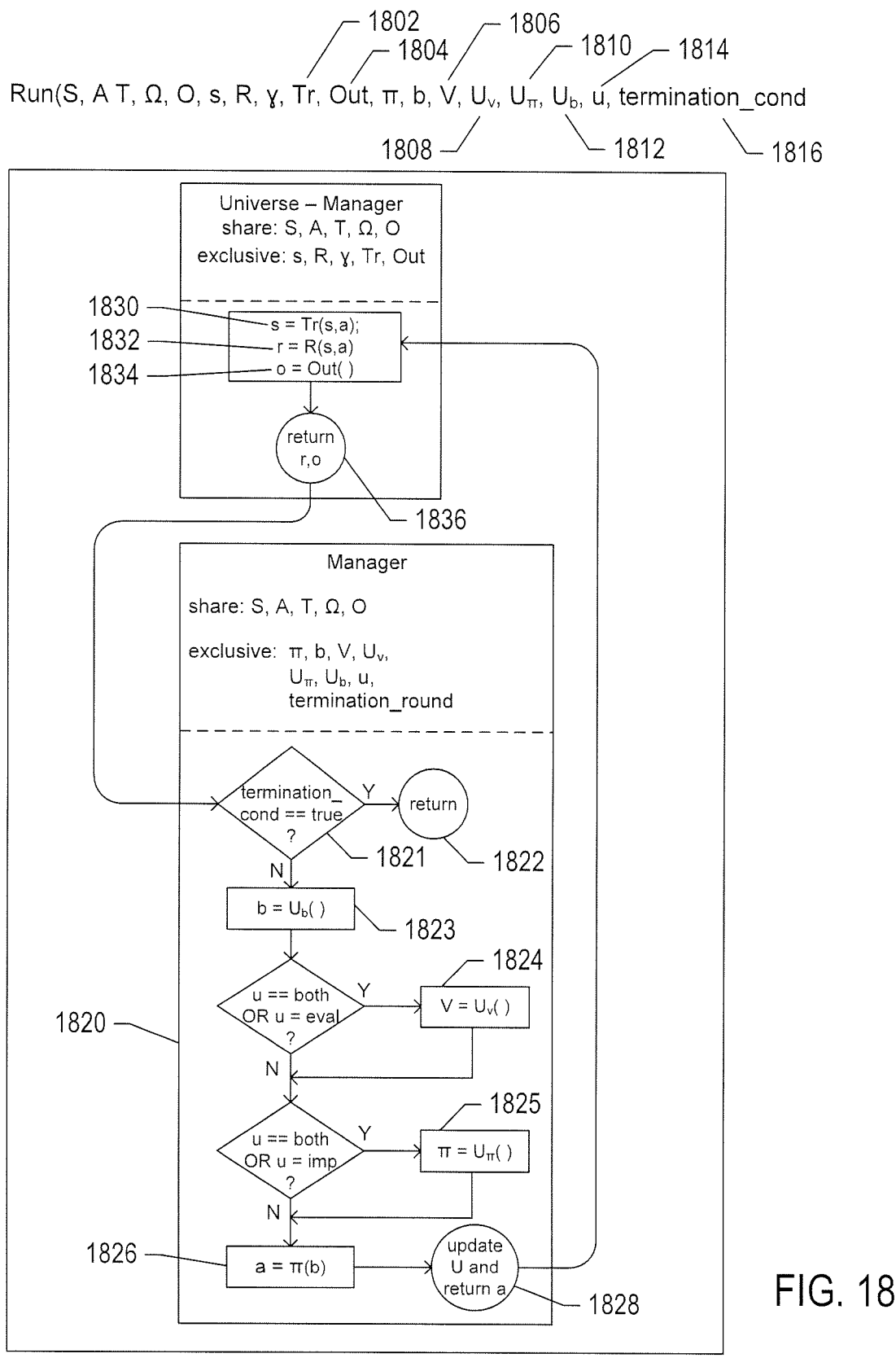
FIG. 18 provides a somewhat more detailed control-flow-like description of operation of the manager and environment than originally provided in FIG. 16A.

FIG. 18 provides a somewhat more detailed control-flow-like description of operation of the manager and environment than originally provided in FIG. 16A. The control-flow-like presentation corresponds to a run of the manager and environment that continues until a termination condition evaluates to TRUE. In addition to the previously discussed sets and functions, this model includes a state-transition function Tr 1802, an observation-generation function Out 1804, a value function V 1806, update functions $U_v$ 1808, $U_\pi$ 1810, and $U_b$ 1812 that update the value function, policy, and belief distribution, respectively, an update variable u 1814 that indicates whether to update the value function, policy, or both, and a termination condition 1816. The manager 1820 determines whether the termination condition evaluates to TRUE, in step 1821, and, if so, terminates in step 1822. Otherwise, the manager updates the belief, in step 1823 and updates one or both of the value function and policy, in steps 1824 and 1825, depending on the current value of the update variable u. In step 1826, the manager generates a new action and, in step 1828, updates the update variable u and issues the generated action to the environment. The environment determines a new state 1830, determines a reward 1832, and determines an observation 1834 and returns the generated reward and observation in step 1836.

Figure 19:
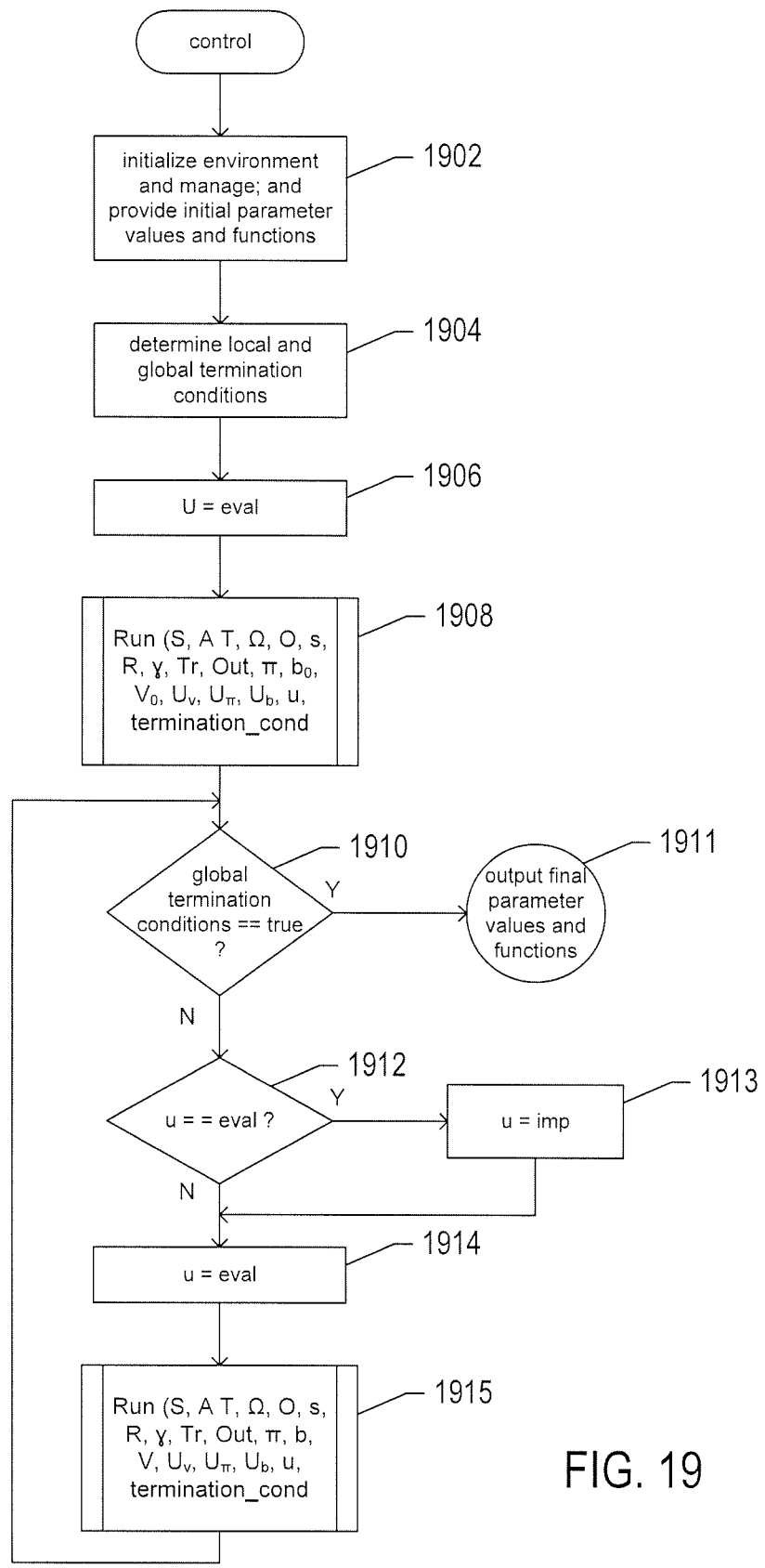
FIG. 19 provides a traditional control-flow diagram for operation of the manager and environment over multiple runs.

FIG. 19 provides a traditional control-flow diagram for operation of the manager and environment over multiple runs. In step 1902, the environment and manager are initialized. This involves initializing certain of the various sets, functions, parameters, and variables shown at the top of FIG. 18. In step 1904, local and global termination conditions are determined. When the local termination condition evaluates to TRUE, the run terminates. When the global termination condition evaluates to TRUE, operation of the manager terminates. In step 1906, the update variable u it is initialized to indicate that the value function should be updated during the initial run. Step 1908 consists of the initial run, during which the value function is updated with respect to the initial policy. Then, additional runs are carried out in the loop of steps 1910-1915. When the global termination condition evaluates to TRUE, as determined in step 1910, operation of the manager is terminated in step 1911, with output of the final parameter values and functions. Thus, the manager may be operated for training purposes, according to the control-flow diagram shown in FIG. 19, with the final output parameter values and functions stored so that the manager can be subsequently operated, according to the control-flow diagram shown in FIG. 19, to control a live system. Otherwise, when the global termination condition does not evaluate to TRUE and when the update variable u has a value indicating that the value function should be updated, as determined in step 1912, the value stored in the update variable u is changed to indicate that the policy should be updated, in step 1913. Otherwise, the value stored in the update variable u is changed to indicate that the value function should be updated, in step 1914. Then, a next run, described by the control-flow-like diagram shown in FIG. 18, is carried out in step 1915. Following termination of this run, control flows back to step 1910 for a next iteration of the loop of steps 1910-1915. In alternative implementations, the update variable u may be initially set to indicate that both the value function and policy should be updated during each run and the update variable u is not subsequently changed. This approach involves different value-function and policy update functions than those used when only one of the value function and policy is updated during each run.

Figure 20:
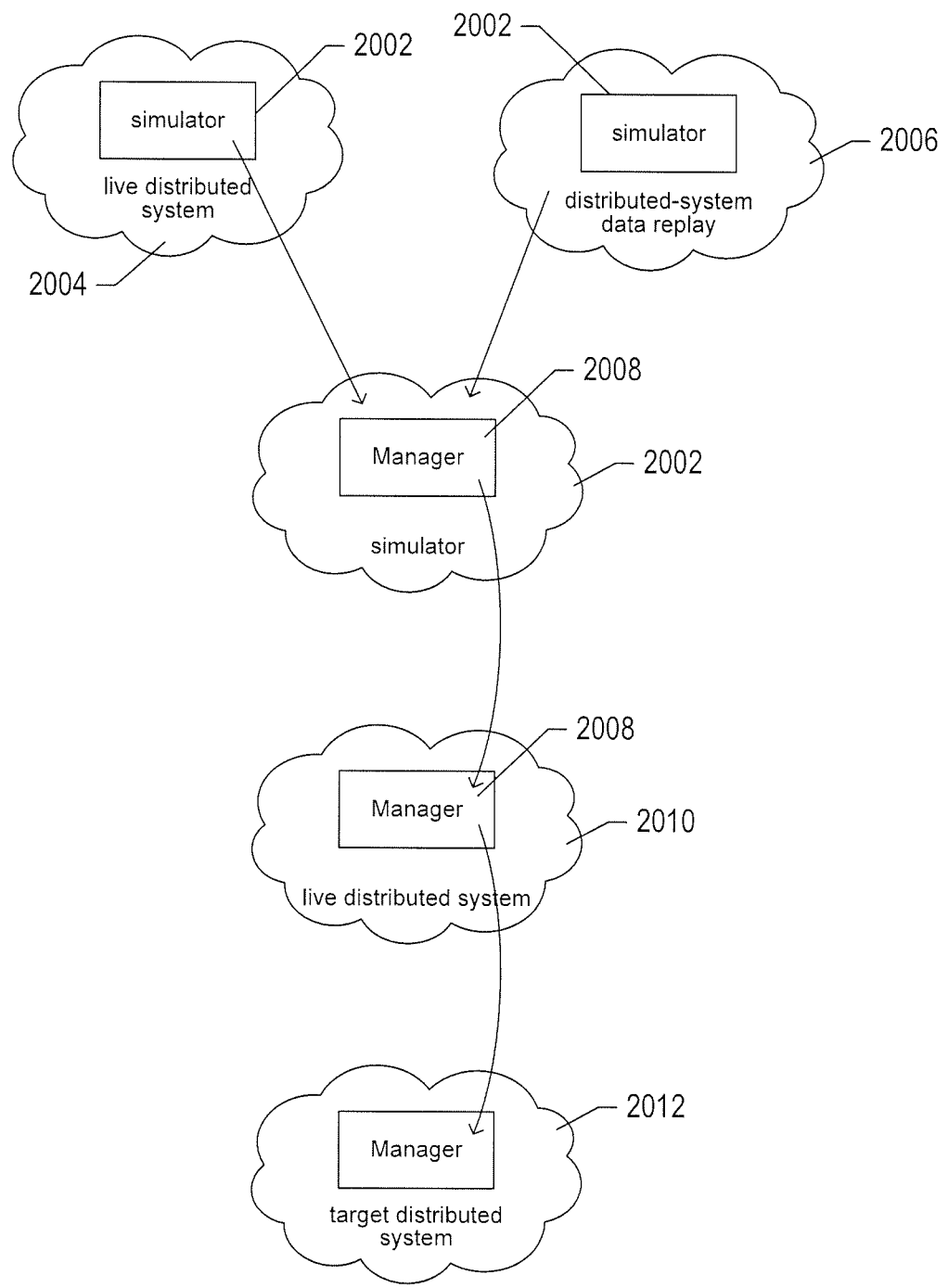
FIG. 20 illustrates one approach to using reinforcement learning to generate and operate an application manager.

FIG. 20 illustrates one approach to using reinforcement learning to generate and operate an application manager. First, reinforcement learning is used to train an environment simulator 2002 by one or both of operating the simulator against a live-distributed-system environment 2004 or against a simulated distributed-system environment that replays archived data generated by a live distributed system to the simulator 2006. Then, a manager 2008 is initially trained by controlling an environment consisting of the simulator 2002. The manager, once trained, is then operated for a time to control an environment comprising a live distributed system 2010. Once the manager has been trained both against the simulator and the live distributed system, it is ready to be deployed to manage an environment 2012 comprising a target live distributed system.

Currently Disclosed Modular
Reinforcement-Learning Application Manager

Figure 21A:
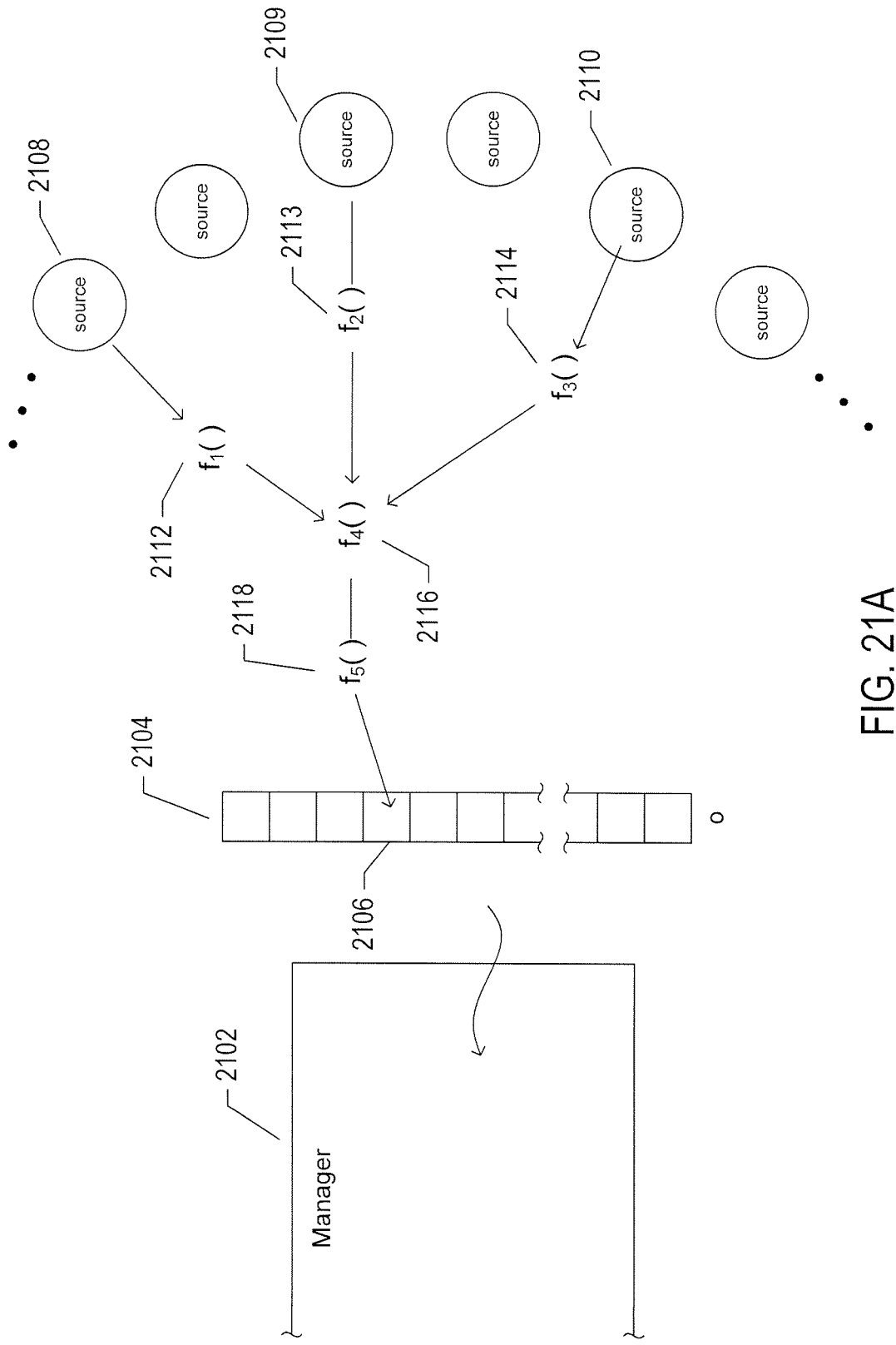
FIGS. 21A-B illustrate aspects of current architectures for reinforcement-learning managers and controllers.
Figure 21B:
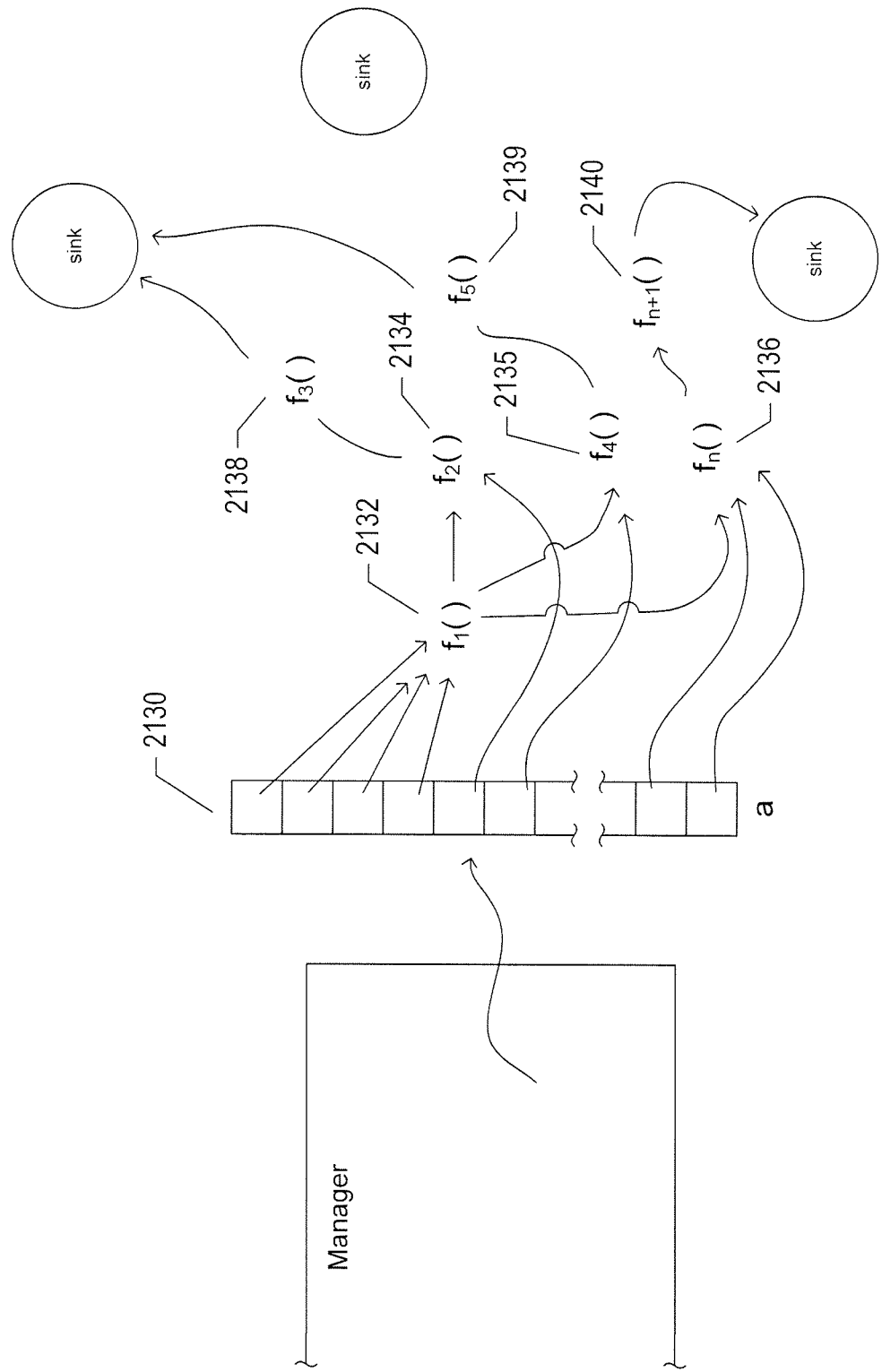

FIGS. 21A-B illustrate aspects of current architectures for reinforcement-learning managers and controllers. The illustration conventions used in FIGS. 21 A-B, next discussed with reference to FIG. 21A, are subsequently used in FIGS. 22-23. In FIG. 21A, the manager 2102 is shown as a portion of a rectangle and the environment includes everything else in the figure. As discussed above, in the case of an application manager, the environment comprises the applications managed by the application manager and the physical computing systems on which the applications managed by the application manager run. As also discussed above, in order to prepare an observation o 2104, the environment may need to access a variety of different information sources, extract information from the information sources, process that information, and combine the information in order to produce values for the elements of the observation. For example, as shown in FIG. 2 A, in order to generate a value for element 2106 in the observation 2104, the environment accesses three different information sources 2108-2110 and initially processes the information extracted from the information sources, as represented by the corresponding functions 2112-2114. The environment then combines the initially processed information to generate a composite value or other initially processed information, as represented by function 2116, and then converts the composite value or information, as represented by function 2118, to a value that can be inserted into element 2106 of observation 2104. In other words, although the environment and the manager are logically considered to be separate in the reinforcement-learning approach, in practical implementations, they are programmatically enmeshed with one another. The environment needs to understand how to transform information collected for observations into a specific observation vector o that includes the types of values within expected value ranges that the manager has been developed to receive and process. Similarly, as shown in FIG. 21B, when the manager issues an action a 2130, which may be a vector of values, the environment needs to be programmed to process the action and transform the action into a series of commands that the environment issues to particular subsystems and interfaces to carry out the action. As an example, as shown in FIG. 21B, initial processing, represented by function 2132, may extract certain values from the action in order to determine the type of action and other higher-level characteristics of the action and then call additional functions, represented by functions 2134-2136 that extract additional values from the action in order to generate commands which are then submitted to various interfaces and subsystems via functions 2138-2140. Thus, the environment and the manager tend to be tightly intertwined in current implementations. Were the manager to control only a single environment, then this type of intertwined implementation would perhaps be acceptably cost-effective and efficient. However, as discussed above with reference to FIG. 20, many development cycles involve the manager controlling a variety of different environments, including a simulator, a live-distributed-system trainer, and then a target distributed system. Currently, all of these different environments need to be hardcoded to incorporate the manager. Not only does this involve extensive redundant development, but hard coding of the interactions between the manager and multiple environments is a source for many different types of errors and incompatibilities, which may adversely affect the quality of training and the operational reliability and robustness of application managers produced by the training.

Figure 22:
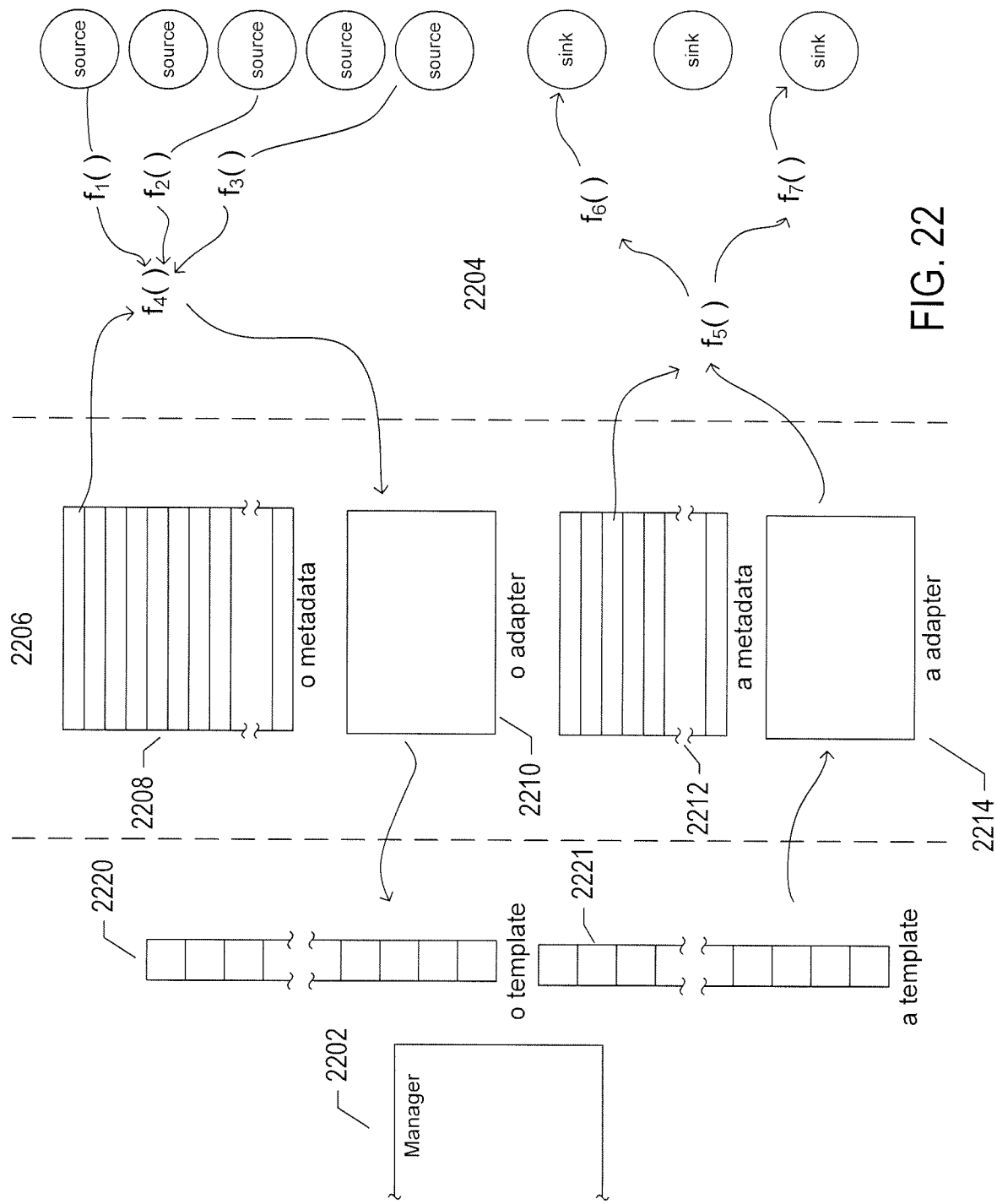
FIG. 22 illustrates an interface architecture of the currently disclosed modular-reinforcement-based-application-manager that addresses the problem discussed in the preceding paragraph with reference to FIGS. 21A-B.

FIG. 22 illustrates an interface architecture of the currently disclosed modular-reinforcement-based-application-manager that addresses the problem discussed in the preceding paragraph with reference to FIGS. 21A-B. As shown in FIG. 22, the currently disclosed modular reinforcement-based application manager 2202 is isolated from the environment that it controls 2204 by a metadata-and-adapter layer 2206. This layer includes observation metadata 2208, an observation adapter 2210, action metadata 2212, and an action adapter. These may be combined together in an interface library developed for the manager that can be incorporated within those components and subsystems of an environment that interact with the manager. The observation and action metadata includes descriptions and formatting specifications for each observation element and each action element. The observation adapter and action adapter provide transformations between the metadata-specified contents of observations and actions used by the environment and the generally numeric-value vectors 2220 and 2221 that the manager receives and outputs. This allows for much simpler implementation of those components of the environment that interact with the manager. In certain cases, the environment can use metadata in order to construct observations in real time, without hard coding observation-generation functionality to specific types of observations and observation content. In other cases, for increased efficiency, developers can use the metadata to generate routines for preparing observations. In both cases, the observations generated by the environment, referred to as "generic observations," are then submitted to the observation adapter, which transforms the generic observations into the numeric-value vectors expected by the manager. Similarly, the action adapter 2214 receives a numeric-value vector and transforms it into a generic action vector described by the action metadata. The components of the environment that receive actions can employ the metadata, in real time, to parse the generic action vector output by the action adapter and use the information extracted from the generic action vector to issue commands. Alternatively, for increased efficiency, developers of components and subsystems within the environment that receive actions can use the metadata to design routines for processing generic action vectors. In all cases, the interface layer 2206 renders the manager modular, so that the manager can be used to control a variety of different types of environments without requiring the environments to be extensively recoded in order to interface to the manager. Comparing FIG. 22 with FIGS. 21A-B, it is apparent that the implementation needed within the environment to interface to the currently disclosed modular manager requires far processing steps then in the case that the environment needs to be programmatically interfaced to a non-modular manager.

FIG. 23 illustrates an additional feature of the currently disclosed modular reinforcement-learning-based application manager. The additional feature is a reward module 2302 that generates rewards according to a user-defined reward function R. In currently available reinforcement-learning-based managers and controllers, the reward-generation logic is hardcoded into interfacing logic that tightly intertwines the currently available managers and controllers to those subsystems and components of the environment that interface to the currently available managers and controllers. However, the rewards are essentially the levers or parameters that specify how they reinforcement-learning-based manager or controller is to optimize itself. Different users may wish to use different types of reward functions in order to differently optimize application management. Currently available managers and controllers cannot be easily adjusted, by users, to provide different types of rewards in order to encourage different types of control policies and optimizations. As shown in FIG. 23, the reward module 2302 can take advantage of the observation and action metadata and observation and action adapters in order to allow for specification of generic reward functions, rather than requiring hard coding of the logic needed to interpret manager-issued actions and environment-prepared observations issued to the manager, significantly simplifying reward-function specification.

Figure 24A:
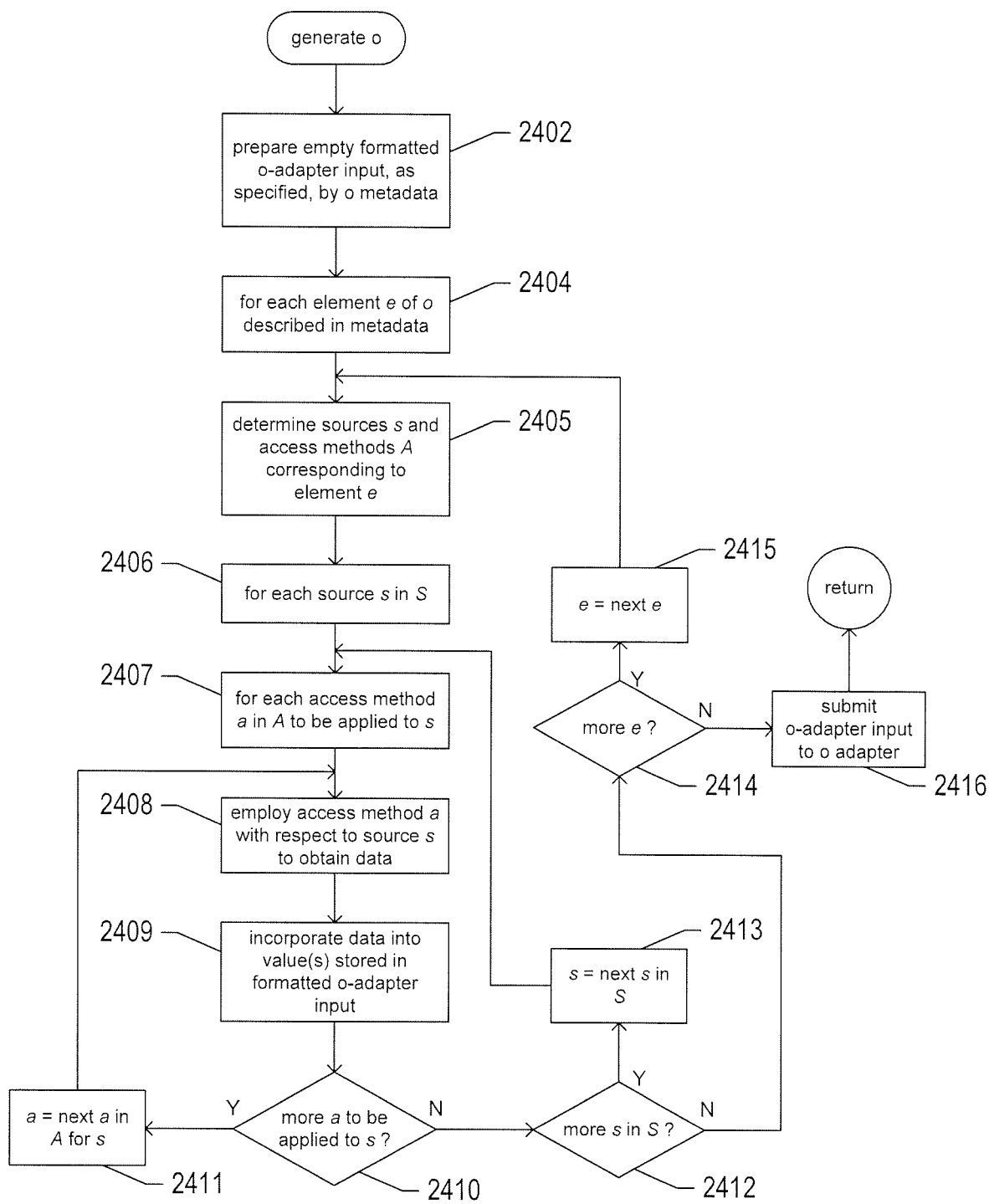
FIGS. 24A-B provide control-flow diagrams that illustrate how components and subsystems of the environment generate observations and process actions via the currently disclosed interface layer of the currently disclosed modular reinforcement-learning-based application manager.
Figure 24B:
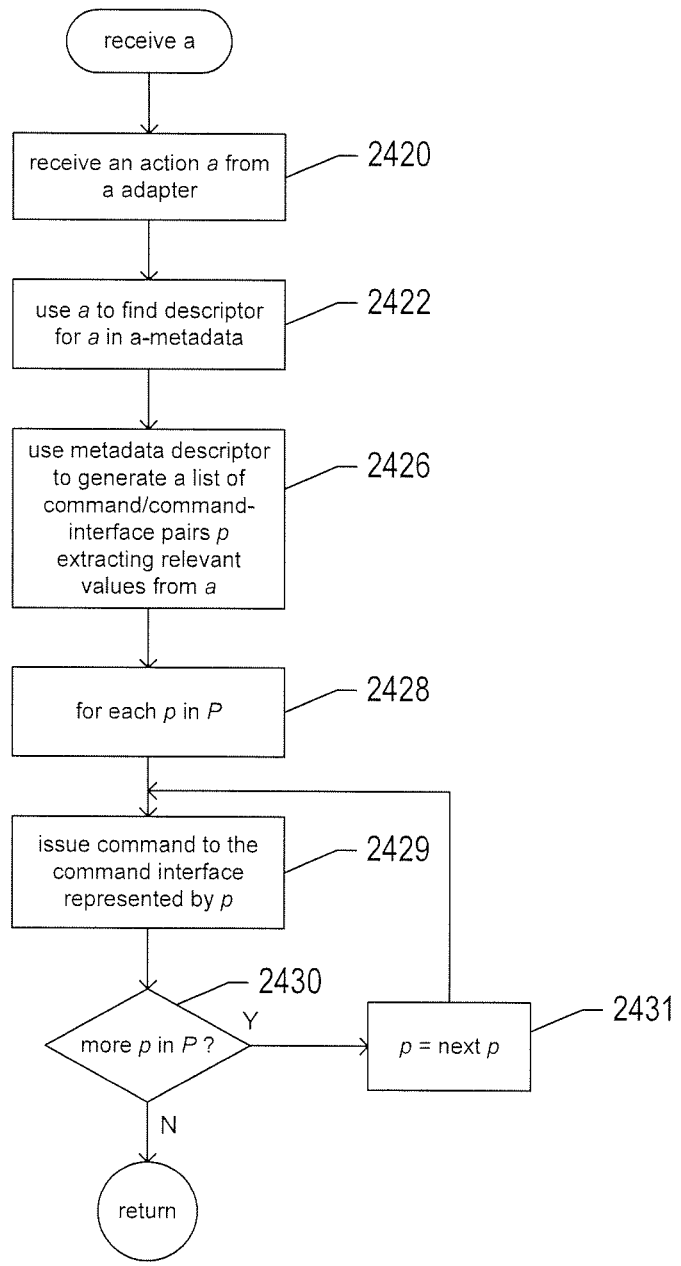

FIGS. 24A-B provide control-flow diagrams that illustrate how components and subsystems of the environment generate observations and process actions via the currently disclosed interface layer of the currently disclosed modular reinforcement-learning-based application manager. FIG. 24A provides a control-flow diagram for a routine "generate o" that illustrates how the environment generates observations for consumption by the currently disclosed modular reinforcement-learning-based application manager. In step 2402, the environment prepares an empty, formatted observation-adapter-input data structure, specified by the observation metadata. Then, in the outer for-loop of steps 2404-2415, the environment prepares the data for each element e of the observation vector. In step 2405, the environment determines the information sources S and access methods A needed to obtain the information for the currently considered observation element e. In the inner for-loop of steps 2406-2413, the environment considers each source s in the set of sources S and, in the innermost for-loop of steps 2407-2411, the environment considers each access method in the set of access methods A that need to be used or applied to the currently considered source s. In step 2408, the environment employs currently considered access method a to access currently considered source s in order to obtain the needed data that is then, in step 2409, incorporated into the value or values stored in the formatted observation-adapter-input data structure. When the three nested for-loops have completed execution, the environment submits the observation-adapter-input data structure to the observation adapter, in step 2416. The flow-control diagram provided in FIG. 24A illustrates a real-time metadata-driven approach to preparing and submitting observation vectors to the currently disclosed interface layer. Alternatively, as discussed above, portions of the logic can be encoded into a routine by developers of environment systems and subsystems that prepare and submit observation vectors to the application manager.

FIG. 24B provides a control-flow diagram that illustrates how components and subsystems of the environment process actions issued by the currently disclosed modular reinforcement-learning-based application manager. In step 2420, the environment receives an action a from the action adapter. In step 2422, the environment uses one or more values in the generic action issued by the adapter to find a description of the adapter in the action metadata. In step 2426, the environment uses the metadata description of the action to generate a list of commands/command-interface pairs P that represent implementation of the action within the environment. Then in the for-loop of steps 2428-2431, the environment issues each command to the corresponding command interface in order to carry out the action.

Figure 25A:
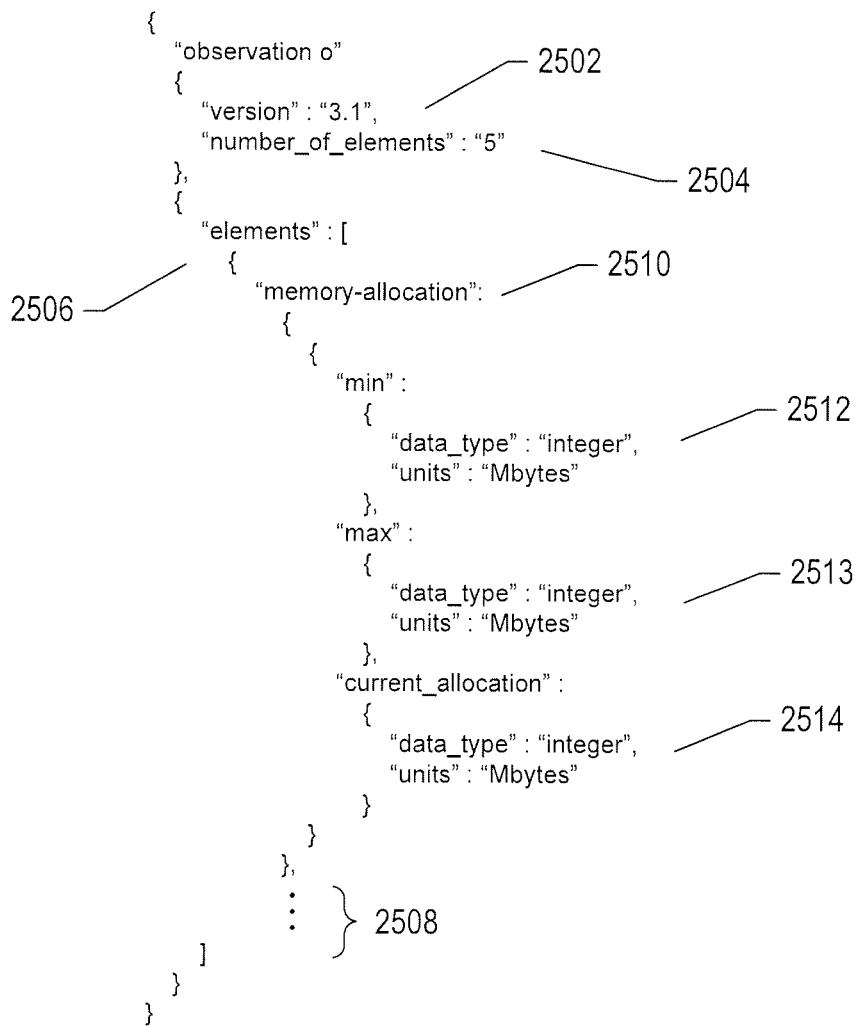
FIGS. 25A-B illustrate an example of one implementation of observation metadata and how a generic observation is transformed by the observation adapter.
Figure 25B:
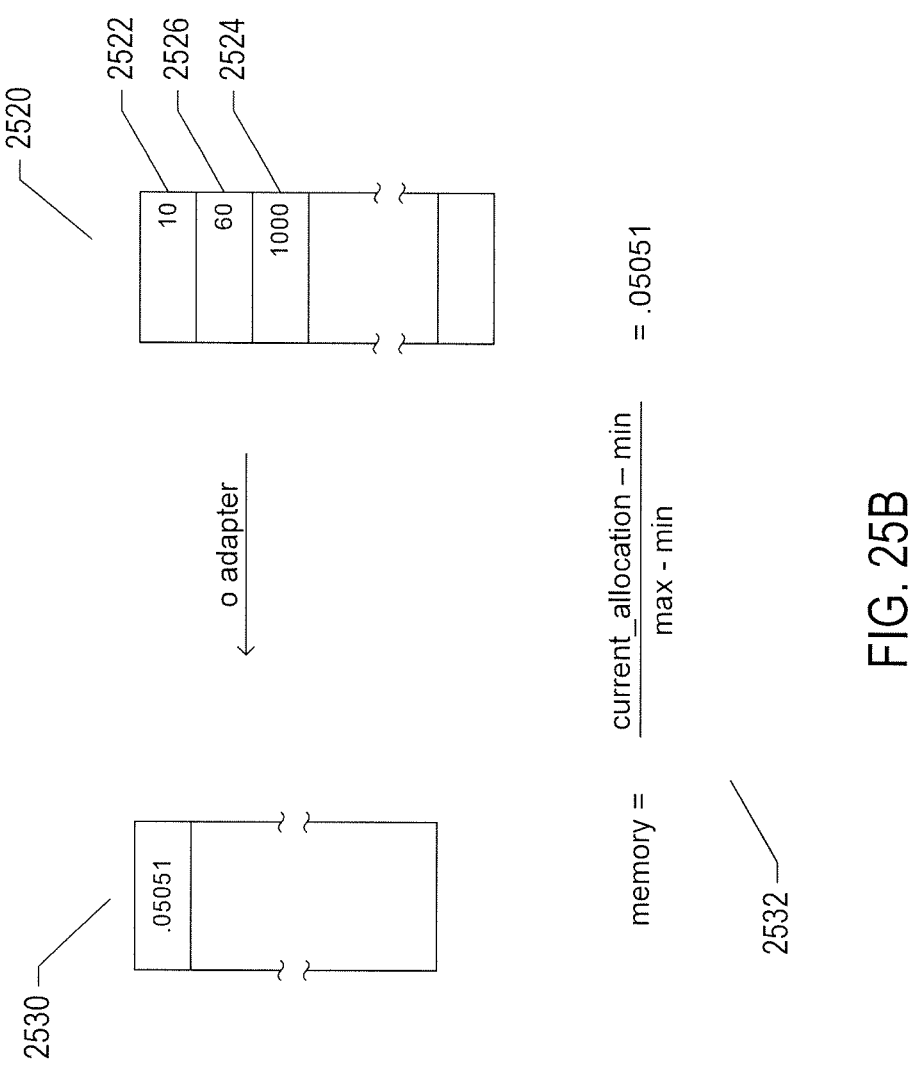

FIGS. 25A-B illustrate an example of one implementation of observation metadata and how a generic observation is transformed by the observation adapter into a numeric-value-vector observation expected by the reinforcement-learning-based application manager. FIG. 25A shows a small portion of an example JavaScript Object Notation ("JSON") encoding of observation metadata. The metadata includes indications of the metadata version 2502 and the number of elements expected in a generic observation 2504 and then includes an array that begins with line 2506 in which the contents of each element is specified. FIG. 25A shows only the metadata for the first element, in this example. Ellipses 2508 indicate that additional elements would be similarly specified. The first element is named "memory-allocation" 2510. This element is specified by three integer values 2512-2514 named "min," "max," and "current_allocation," respectively, with the integers representing megabytes of memory. In this example, the amount of memory currently allocated to a distributed application is encoded by indicating the minimum amount of memory that can be allocated to an application, the maximum amount of memory that can be allocated to the application, and the current amount of memory allocated to the application, all in units of megabytes. As shown in FIG. 25B, the generic action vector 2520 prepared according to the metadata specification includes, for the first element of the observation, the specified indications of the minimum 2522, maximum 2524, and current 2526 memory allocations. The observation adapter transforms the generic observation vector into an observation vector formatted according to the expectations of the application manager 2530, which includes only a single numeric value representing the current memory allocation. The observation adapter computes this value as indicated by expression 2532, which is a ratio indicating the percentage of the maximum memory allocation currently allocated to the application. Similar types of transformations and metadata encodings would be used to specify and transform other observation-vector elements.

Figure 26B:
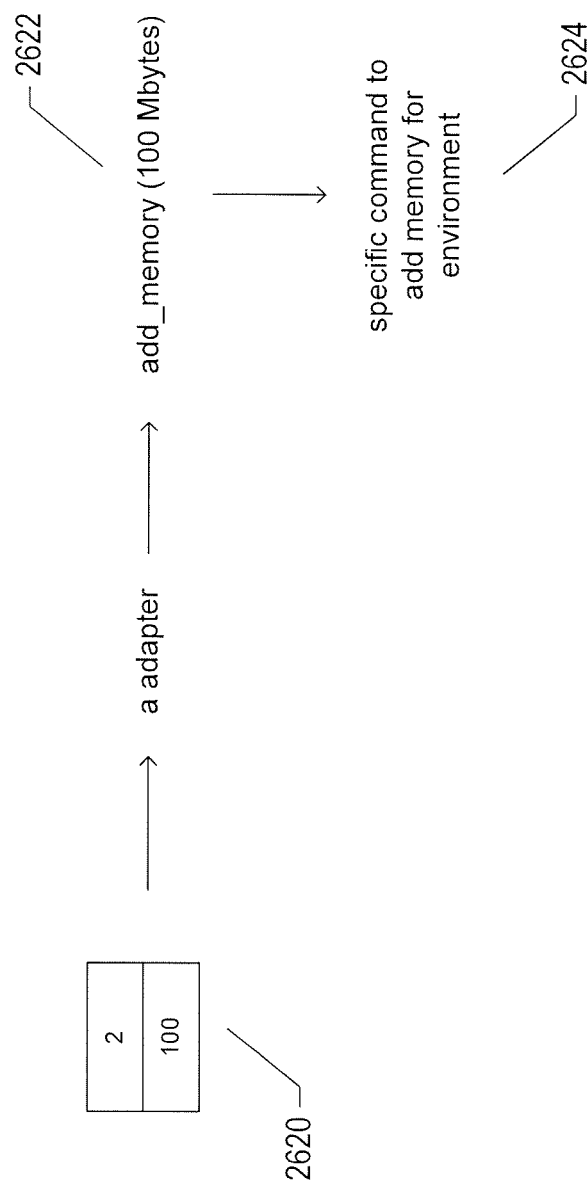

FIGS. 26A-B illustrate an example of one implementation of action metadata and how a generic action is output by the action adapter. FIG. 26A shows a JSON encoding of action metadata according to the currently discussed example. The actions metadata includes an action-metadata version 2602 and an indication of the number of actions 2604. Each generic action vector includes an integer identifier 2606 and then additional information described by an array of descriptions 2608 for each action. The second action 2610 is called "add_memory" 2612 and is described as a command to allocate additional memory for a virtual machine in which the application is running from the virtualization layer 2614. This command includes a single argument 2616 that is an integer specifying the amount of memory to add, in megabytes. FIG. 26B illustrates how the environment receives an action from the adapter. In this case, the modular reinforcement-learning-based application manager emits a relatively simple action vector 2620 that the action adapter then transforms into the generic action 2622. The environments can use the descriptions of this command and the metadata to determine the nature of the command represented by the action and to interpret any arguments included in the command and to then convert the generic action into specific commands to carry out the action in the environment 2624. In more complex examples, the action adapter may need to carry out various types of transformations on the numeric values included in the action vector emitted by the reinforcement-learning-based application manager in order to prepare a generic action command.

Although the present invention has been described in terms of particular embodiments, it is not intended that the invention be limited to these embodiments. Modification within the spirit of the invention will be apparent to those skilled in the art. For example, any of a variety of different implementations of the currently disclosed modular reinforcement-learning application manager can be obtained by varying any of many different design and implementation parameters, including modular organization, programming language, underlying operating system, control structures, data structures, and other such design and implementation parameters. Many different types of observation-metadata and action-metadata specifications can be used, in this metadata can be encoded in a variety of different types of metadata-specification languages, including XML, YAML, JSON, and other such languages. In certain implementations, the observation and action adapters may be considered to be part of the application manager, while, in other implementations, the observation actually adapters may be incorporated into the environment via libraries. In certain implementations, the observation and action adapters may be consolidated into a single adapter, while in other implementations, a larger number of adapters may be implemented. The types of transformations carried out by the adapters depend on the metadata specifications as well as on the specific implementation of the application manager. These transformations may be of arbitrary complexity and, of course, maybe programmatically specified. In certain cases, the transformations may be specified by scripts or other higher-level logic encodings. User-specified reward functions may be specified in scripts, routines, or, in certain implementations, may be specified through a reward-function-construction user interface.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A modular reinforcement-learning-based application manager that manages one or more applications and a computing environment, within which the applications run, comprising one or more of a distributed computing system having multiple computer systems interconnected by one or more networks, a standalone computer system, and a processor-controlled user device, the modular reinforcement-learning based application manager comprising:
   a reinforcement-learning-based application manager that receives rewards and observations from the computing environment and issues actions to the computing environment in accordance with an internally maintained policy; and
   an interface between the computing environment and the reinforcement-learning-based application manager that
      transforms a manager-specific action issued by the reinforcement-learning-based application manager to a generic action and issues the generic action to the computing environment;
      provides, to the computing environment, generic-actions metadata for the generic actions issued to the computing environment;
      transforms a generic observation generated by the computing environment to an equivalent manager-specific observation and issues the manager-specific observation to the reinforcement-learning-based application manager; and
      provides generic-observations metadata.

2. The modular reinforcement-learning-based application manager of claim 1
   wherein the manager-specific action is encoded as one or more numerical values;
   wherein the generic action is encoded, by the interface, in a generic-action data structure that includes data generated from the numerical values in the manager-specific action; and
   wherein the data in the generic-action data structure is described by the generic-actions metadata.

3. The modular reinforcement-learning-based application manager of claim 2 wherein the computing environment:
   uses the generic-actions metadata to transform the generic action into one or more commands that implement the generic action; and
   inputs the one or more commands to components and/or subsystems in the computing environment to carry out the generic action.

4. The modular reinforcement-learning-based application manager of claim 1
   wherein the manager-specific observation is encoded as one or more numerical values;

wherein the generic observation is encoded, by the computing environment, in a generic-observation data structure; and wherein the data in the generic-observation data structure is described by the generic-observations metadata.

5. The modular reinforcement-learning-based application manager of claim 4 wherein the computing environment:
uses the generic-observations metadata to determine information sources within the computing environment, and access methods to request information from the information sources, to obtain information needed to generate the generic observation;
uses the generic-observations metadata to encode the obtained information in the generic-observation data structure; and
inputs the generic-observation data structure to the interface.

6. The modular reinforcement-learning-based application manager of claim 1 wherein the generic-observations metadata includes:
data that indicates the number of elements in a generic-observation;
a description of each element in a generic-observation; and
for each data component of a generic-observation element,
an indication of the data type for the data, and
an indication of what the data component represents.

7. The modular reinforcement-learning-based application manager of claim 1 wherein the generic-actions metadata includes:
data that indicates the number of different generic actions; and
for each different generic action,
an indication of the number of data components for the generic action, and
for each data component,
an indication of a data type, and
an indication of what the data component represents.

8. The modular reinforcement-learning-based application manager of claim 1 wherein the computing environment additionally includes a reward module that generates user-specified rewards that are issued to the reinforcement-learning-based application manager.

9. The modular reinforcement-learning-based application manager of claim 8 wherein the reward module provides a user interface through which a user defines a reward function that receives observation data and action data and outputs a numeric reward.

10. The modular reinforcement-learning-based application manager of claim 1 wherein the reinforcement-learning-based application manager maintains a policy and a belief distribution, and updates the policy, during training, to generate, over time, a near-optimal or optimal policy, where a near-optimal policy is closer to an optimal policy than the policies achievable by human administrators and managers.

11. The modular reinforcement-learning-based application manager of claim 10 wherein the policy returns a next action to issue to the computing environment from the current belief distribution.

12. A method for interfacing a computing environment to a reinforcement-learning-based application manager, the method comprising:
incorporating, by the computing environment comprising one or more of a distributed computing system having multiple computer systems interconnected by one or more networks, a standalone computer system, and a processor-controlled user device, an interface that interfaces the computing environment to the reinforcement-learning-based application manager;
transforming, by the interface, a manager-specific actions issued by the reinforcement-learning-based application manager to corresponding generic actions and issuing the generic actions to the computing environment;
providing to the computing environment, by the interface, generic-actions metadata for the generic actions issued to the computing environment;
transforming, by the interface, generic observations generated by the computing environment to equivalent manager-specific observations and issuing, by the interface, the manager-specific observations to the reinforcement-learning-based application manager; and
providing, by the interface, generic-observations metadata.

13. The method of claim 12
wherein the manager-specific actions are each encoded as one or more numerical values;
wherein the generic actions are each encoded, by the interface, in a generic-action data structure that includes data generated from the numerical values in the manager-specific action; and
wherein the data in each generic-action data structure is described by the generic-actions metadata.

14. The method of claim 13 further comprising:
using, by the computing environment, the generic-actions metadata to transform each generic action into one or more commands that implement the generic action; and
inputting, by the computing environment, the one or more commands corresponding to each generic action to components and/or subsystems in the computing environment to carry out the generic action.

15. The method of claim 12
wherein the manager-specific observations are each encoded as one or more numerical values;
wherein the generic observations are each encoded, by the computing environment, in a generic-observation data structure; and
wherein the data in each generic-observation data structure is described by the generic-observations metadata.

16. The method of claim 15 further including:
using, by the computing environment, the generic-observations metadata to determine information sources within the computing environment, and access methods to request information from the information sources, to obtain information needed to generate each generic observation;
using, by the computing environment, the generic-observations metadata to encode the obtained information for each generic observation, in a generic-observation data structure; and
inputting the generic-observation data structure for each generic observation to the interface.

17. A physical data-storage device encoded with computer instructions that implement an interface between a computing environment and a reinforcement-learning-based application manager, the computing environment comprising one or more of a distributed computer system having multiple computer systems interconnected by one or more networks, a standalone computer system, and a processor-controlled user device, and the interface
transforming a manager-specific actions issued by the reinforcement-learning-based application manager to corresponding generic actions and issuing the generic actions to the computing environment;

providing, to the computing environment, generic-actions metadata for the generic actions issued to the computing environment;

transforming generic observations generated by the computing environment to equivalent manager-specific observations and issuing the manager-specific observations to the reinforcement-learning-based application manager; and providing generic-observations metadata for the generic observations.

18. The physical data-storage device of claim 17 wherein the manager-specific actions are each encoded as one or more numerical values;

wherein the generic actions are each encoded, by the interface, in a generic-action data structure that includes data generated from the numerical values in the manager-specific action; and wherein the data in each generic-action data structure is described by the generic-actions metadata.

19. The physical data-storage device of claim 18 wherein the computing environment uses the generic-actions metadata to transform each generic action into one or more commands that implement the generic action; and wherein the computing environment uses the one or more commands corresponding to each generic action to components and/or subsystems in the computing environment to carry out the generic action.

20. The physical data-storage device of claim 17 wherein the manager-specific observations are each encoded as one or more numerical values;

wherein the generic observations are each encoded, by the computing environment, in a generic-observation data structure; and wherein the data in each generic-observation data structure is described by the generic-observations metadata.

21. The physical data-storage device of claim 20 wherein the computing environment uses the generic-observations metadata to determine information sources within the computing environment, and access methods to request information from the information sources, to obtain information needed to generate each generic observation;

wherein the computing environment uses the generic-observations metadata to encode the obtained information for each generic observation, in a generic-observation data structure; and wherein the generic-observation inputs a data structure for each generic observation to the interface.

* * * * *